(12) United States Patent
Zhang et al.

(10) Patent No.: US 11,582,796 B2
(45) Date of Patent: Feb. 14, 2023

(54) LISTEN-BEFORE-TALK (LBT) FAILURE DETECTION IN DORMANT CELL AND OUTSIDE DISCONTINUOUS RECEPTION (DRX) ACTIVE TIME

(71) Applicant: QUALCOMM INCORPORATED, San Diego, CA (US)

(72) Inventors: Xiaoxia Zhang, San Diego, CA (US); Jing Sun, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/948,278

(22) Filed: Sep. 23, 2020

(65) Prior Publication Data

US 2021/0360692 A1    Nov. 18, 2021

Related U.S. Application Data

(60) Provisional application No. 63/025,447, filed on May 15, 2020.

(51) Int. Cl.
| | | |
|---|---|---|
| *H04W 74/08* | (2009.01) | |
| *H04W 76/28* | (2018.01) | |
| *H04W 76/18* | (2018.01) | |
| *H04B 17/318* | (2015.01) | |
| *H04W 24/10* | (2009.01) | |

(Continued)

(52) U.S. Cl.
CPC ...... *H04W 74/0808* (2013.01); *H04B 7/0626* (2013.01); *H04B 17/318* (2015.01); *H04W 24/10* (2013.01); *H04W 52/0229* (2013.01); *H04W 76/18* (2018.02); *H04W 76/28* (2018.02)

(58) Field of Classification Search
CPC . H04W 74/0808; H04W 76/18; H04W 76/28; H04W 24/10; H04W 52/0229; H04B 17/318; H04B 7/0626
See application file for complete search history.

(56) References Cited

U.S. PATENT DOCUMENTS

| | | | | |
|---|---|---|---|---|
| 10,014,970 | B2 * | 7/2018 | Zhang | ............... H04J 11/0056 |
| 10,687,362 | B2 * | 6/2020 | Sun | ............... H04W 72/1268 |
| 10,772,132 | B2 * | 9/2020 | Zhang | ............... H04W 74/0808 |

(Continued)

FOREIGN PATENT DOCUMENTS

| | | | |
|---|---|---|---|
| WO | WO-2017136458 | A2 | 8/2017 |
| WO | WO-2021204916 | A1 * | 10/2021 |

OTHER PUBLICATIONS

International Search Report and Written Opinion—PCT/US2021/026899—ISA/EPO—dated Jul. 7, 2021.

*Primary Examiner* — Parth Patel
(74) *Attorney, Agent, or Firm* — Qualcomm Incorporated

(57) ABSTRACT

Wireless communications systems and methods related to communications in a network are provided. A UE receives a listen-before-talk (LBT) failure detection configuration associated with at least one of a dormant mode or a discontinuous reception (DRX) cycle in a first cell of a wireless communication network. The UE performs, based on the LBT failure detection configuration, an LBT failure detection in the first cell while operating in the dormant mode for the first cell or during an inactive DRX configured-on duration of the DRX cycle. The UE transmits an LBT failure detection report based on the LBT failure detection.

24 Claims, 14 Drawing Sheets

(51) Int. Cl.
  *H04B 7/06*  (2006.01)
  *H04W 52/02* (2009.01)

(56) References Cited

U.S. PATENT DOCUMENTS

| | | | | |
|---|---|---|---|---|
| 10,798,735 | B2* | 10/2020 | Yerramalli | H04W 72/14 |
| 10,912,097 | B2* | 2/2021 | Tian | H04W 72/0406 |
| 10,979,128 | B1* | 4/2021 | Babaei | H04W 76/19 |
| 10,980,059 | B1* | 4/2021 | Babaei | H04W 76/19 |
| 10,980,062 | B1* | 4/2021 | Babaei | H04W 74/0808 |
| 11,032,812 | B2* | 6/2021 | Sun | H04L 27/0006 |
| 11,044,135 | B2* | 6/2021 | Bhattad | H04L 5/0066 |
| 11,284,433 | B2* | 3/2022 | Jang | H04W 24/08 |
| 2010/0112956 | A1* | 5/2010 | Jeong | H04W 76/28 |
| | | | | 455/67.11 |
| 2016/0242083 | A1* | 8/2016 | Guan | H04W 36/0085 |
| 2017/0150382 | A1* | 5/2017 | Martin | H04W 72/0453 |
| 2017/0244536 | A1* | 8/2017 | Li | H04L 5/0062 |
| 2018/0175975 | A1* | 6/2018 | Um | H04W 72/14 |
| 2018/0184362 | A1* | 6/2018 | Babaei | H04W 48/12 |
| 2018/0184475 | A1* | 6/2018 | Babaei | H04W 74/002 |
| 2018/0279340 | A1* | 9/2018 | Skordeman | H04W 72/14 |
| 2018/0279366 | A1* | 9/2018 | Harada | H04W 72/0446 |
| 2019/0082462 | A1* | 3/2019 | Bergstrom | H04W 48/16 |
| 2019/0124690 | A1* | 4/2019 | Siomina | H04W 48/16 |
| 2019/0141639 | A1* | 5/2019 | Rahman | H04W 52/146 |
| 2019/0306738 | A1* | 10/2019 | Berggren | H04W 24/08 |
| 2019/0373635 | A1* | 12/2019 | Yang | H04B 7/0408 |
| 2020/0053824 | A1 | 2/2020 | He | |
| 2020/0107335 | A1* | 4/2020 | Xue | H04W 36/0058 |
| 2020/0221495 | A1* | 7/2020 | Chen | H04W 36/305 |
| 2020/0275484 | A1* | 8/2020 | Xu | H04W 72/0453 |
| 2020/0275485 | A1* | 8/2020 | Babaei | H04W 74/004 |
| 2020/0351822 | A1* | 11/2020 | Roy | H04W 76/27 |
| 2021/0007146 | A1* | 1/2021 | Agiwal | H04W 76/11 |
| 2021/0029768 | A1* | 1/2021 | Shih | H04W 74/0808 |
| 2021/0051640 | A1* | 2/2021 | Pao | H04W 72/0413 |
| 2021/0100031 | A1* | 4/2021 | Cirik | H04W 74/0833 |
| 2021/0144762 | A1* | 5/2021 | Tsai | H04W 72/1284 |
| 2021/0153245 | A1* | 5/2021 | Tooher | H04W 72/0453 |
| 2021/0168774 | A1* | 6/2021 | Li | H04L 5/001 |
| 2021/0176710 | A1* | 6/2021 | Tooher | H04W 72/1289 |
| 2021/0204321 | A1* | 7/2021 | Babaei | H04W 16/14 |
| 2021/0219322 | A1* | 7/2021 | Chin | H04W 72/1284 |
| 2021/0235500 | A1* | 7/2021 | Hong | H04W 76/18 |
| 2021/0250156 | A1* | 8/2021 | Kim | H04L 1/0026 |
| 2021/0259044 | A1* | 8/2021 | Islam | H04W 52/0229 |
| 2021/0352654 | A1* | 11/2021 | Al | H04W 72/0446 |
| 2021/0360621 | A1* | 11/2021 | Jiang | H04W 24/02 |
| 2021/0360692 | A1* | 11/2021 | Zhang | H04W 52/0229 |
| 2021/0360695 | A1* | 11/2021 | Zhou | H04W 74/0825 |
| 2021/0360736 | A1* | 11/2021 | Chen | H04W 80/02 |
| 2022/0124786 | A1* | 4/2022 | Mukherjee | H04W 76/27 |

* cited by examiner

LISTEN-BEFORE-TALK (LBT) FAILURE DETECTION IN DORMANT CELL AND OUTSIDE DISCONTINUOUS RECEPTION (DRX) ACTIVE TIME

CROSS REFERENCE TO RELATED APPLICATIONS

The present application claims priority to and the benefit of U.S. Provisional Patent Application No. 63/025,447, filed May 15, 2020, which is hereby incorporated by reference in its entirety as if fully set forth below and for all applicable purposes.

TECHNICAL FIELD

This application relates to wireless communication systems, and more particularly to listen-before-talk (LBT) failure detection and channel occupancy detection in a dormant mode and outside discontinuous reception (DRX) active time.

INTRODUCTION

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR operating entities that may not have access to a licensed spectrum.

NR-unlicensed (NR-U) may refer to the deployment of an NR cell in an unlicensed spectrum. For example, an NR cell may be deployed in a standalone NR-U mode over one or more unlicensed frequency bands. NR-U may also support cell deployments using various combinations of unlicensed bands and licensed bands. For example, an NR cell may be deployed using carrier aggregation to combine an NR licensed band with an NR unlicensed band, where the licensed band may function as an anchor carrier or a primary cell (Pcell) and the unlicensed band may function as a supplemental carrier or a secondary cell (Scell). The Scell may include an uplink (UL) component carrier and a downlink (DL) component carrier. Alternatively, the Scell may include a DL component carrier only. In another example, an NR cell may be deployed using dual connectivity between an LTE licensed band and a NR unlicensed band, where the LTE licensed band may function as a Pcell and the NR unlicensed band may function as an Scell. In yet another example, an NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE), a listen-before-talk (LBT) failure detection configuration associated with at least one of a dormant mode or a discontinuous reception (DRX) cycle in a first cell of a wireless communication network. The method further includes performing, based on the LBT failure detection configuration, an LBT failure detection in the first cell while operating in the dormant mode for the first cell or during an inactive DRX configured-on duration of the DRX cycle. The method further includes transmitting an LBT failure detection report based on the LBT failure detection.

In an additional aspect of the disclosure, a UE includes a transceiver configured to receive a listen-before-talk (LBT) failure detection configuration associated with at least one of a dormant mode or a discontinuous reception (DRX) cycle in a first cell of a wireless communication network. The UE further includes a processor configured to perform, based on the LBT failure detection configuration, an LBT failure detection in the first cell while operating in the dormant mode for the first cell or during an inactive DRX configured-on duration of the DRX cycle. The transceiver is further configured to transmit an LBT failure detection report based on the LBT failure detection.

In an additional aspect of the disclosure, a non-transitory computer-readable medium includes program code recorded thereon, the program code including code for causing a UE to receive a listen-before-talk (LBT) failure detection configuration associated with at least one of a dormant mode or a discontinuous reception (DRX) cycle in a first cell of a wireless communication network. The non-transitory computer-readable medium further includes code for causing the UE to perform, based on the LBT failure detection configuration, an LBT failure detection in the first cell while operating in the dormant mode for the first cell or during an inactive DRX configured-on duration of the DRX cycle. The non-transitory computer-readable medium further includes code for causing the UE to transmit an LBT failure detection report based on the LBT failure detection.

In an additional aspect of the disclosure, n UE includes means for receiving a listen-before-talk (LBT) failure detection configuration associated with at least one of a dormant mode or a discontinuous reception (DRX) cycle in a first cell of a wireless communication network. The UE further includes means for performing, based on the LBT failure detection configuration, an LBT failure detection in the first cell while operating in the dormant mode for the first cell or during an inactive DRX configured-on duration of the DRX cycle. The UE further includes means for transmitting an LBT failure detection report based on the LBT failure detection.

In an aspect of the disclosure, a method of wireless communication includes transmitting, by a base station (BS), to a user equipment (UE), a listen-before-talk (LBT) failure detection configuration associated with at least one of a dormant mode or a discontinuous reception (DRX) cycle in a first cell of a wireless communication network. The method further includes receiving, from the UE, based on the LBT failure detection configuration, an LBT failure detection report indicating an LBT failure detection by the UE in the first cell while the UE is operating in the dormant mode for the first cell or during an inactive DRX configured-on duration of the DRX cycle.

In an additional aspect of the disclosure, a BS includes a transceiver configured to transmit, to a user equipment (UE), a listen-before-talk (LBT) failure detection configuration associated with at least one of a dormant mode or a discontinuous reception (DRX) cycle in a first cell of a wireless communication network. The transceiver is further configured to receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

In an additional aspect of the disclosure, a non-transitory computer-readable medium includes program code recorded thereon, the program code including code for causing a base station (BS) to transmit, to a user equipment (UE), a listen-before-talk (LBT) failure detection configuration associated with at least one of a dormant mode or a discontinuous reception (DRX) cycle in a first cell of a wireless communication network. The computer-readable medium further includes code for causing the BS to receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

In an additional aspect of the disclosure, a BS includes means for transmitting, to a user equipment (UE), a listen-before-talk (LBT) failure detection configuration associated with at least one of a dormant mode or a discontinuous reception (DRX) cycle in a first cell of a wireless communication network. The BS further includes means for receiving, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
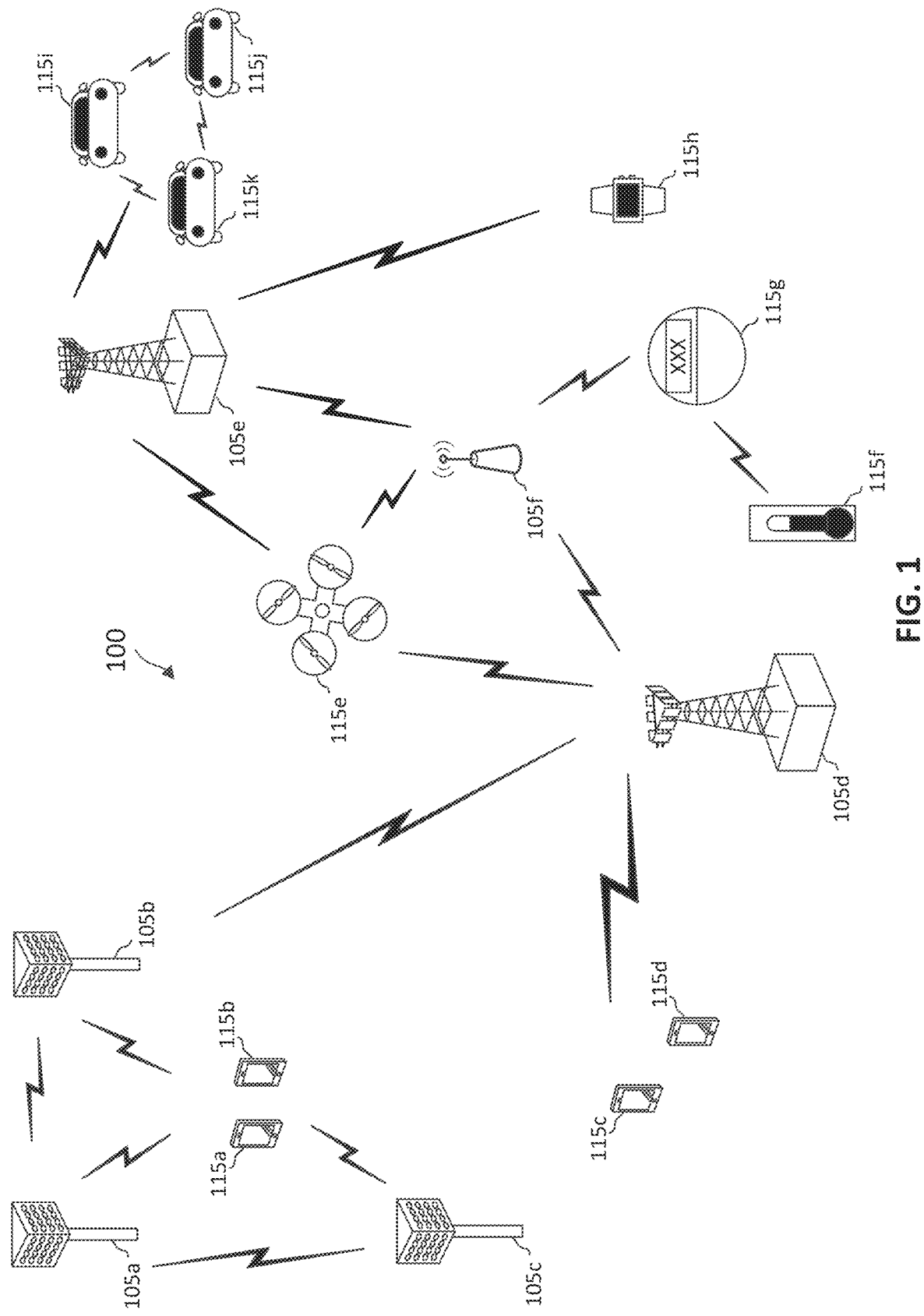
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In order to transfer data at a higher rate, a UE and a BS may communicate over multiple frequency bands in parallel (a form of carrier aggregation). In this configuration, one of the bands can be associated with a primary cell (Pcell) and another with a secondary cell (Scell). When the full bandwidth is not required, the UE may be configured to go into a lower power mode. For example, the BS may configure the UE operate in a dormant mode in the Scell. When operating in the dormant mode in the SCell, the UE may be configured to perform channel state information (CSI) measurements, beam measurements, and/or automatic gain control (AGC) in the SCell, but may not perform physical downlink control channel (PDCCH) monitoring. In other words, the UE is not expected to transmit UL data to the BS and/or receive DL data from the BS in the SCell, but the connection with the BS or network is maintained so that when data needs to be transferred the SCell can be reactivated quickly without having to perform another connection setup.

In another example, a discontinuous reception (DRX) mode may be used to allow a UE to operate at a lower power mode. To operate in the DRX mode, a BS may configure a UE with a DRX cycle, which may include an on-duration and an off-duration. During a configured-on duration, the UE may monitor for PDCCH from the BS. During a configured off-duration, the UE may enter a low power mode or a sleep mode, where the UE is not expected to receive PDCCH from the BS. To provide further power saving, the BS may configure the UE with wake-up signal (WUS) monitoring occasions, where each WUS monitoring occasion may be followed by a configured-on duration. The UE may listen for a WUS in the WUS monitoring occasions. If a WUS is received during a WUS occasion, then the UE may be activated for the configured-on duration. For instance, the UE may perform PDCCH monitoring during the configured-on duration and may be scheduled by the BS for UL and/or DL transmissions during the configured-on duration. It the UE fails to detect a WUS in a certain WUS monitoring occasion, the UE may continue to remain in the inactive mode (e.g., sleep mode) during the following configured-on duration. As such, the BS may determine whether to transmit a WUS to the UE based on traffic load without having the UE to operate in an active mode for each configured-on duration, and thus allowing for further power saving at the UE. A DRX configured-on duration without a preceding WUS may be referred to as an inactive DRX configured-on duration.

While the dormant mode and the DRX mode allow the UE to conserve power by partially turning off at least some components (e.g., radio frontend (RF) components) at the UE, there is a latency associated with reactivating. In order to balance power savings with low activation latency, the UE can perform some operations while in low power mode to maintain the connection. For example, a UE in which a Scell is dormant, the UE may perform CSI measurements, AGC, and beam management if configured to do so. The CSI, AGC, and/or beam measurements consume power at the UE. As such, there is a tradeoff between activation latency and power consumption. In some aspects, a Scell operates over is an unlicensed band, which may be shared by other wireless nodes. Channel access is based on contention, for example, using LBT mechanisms. Thus, it is not guaranteed that the channel will be available for use when the Scell is activated. The CSI and/or beams measurements do not provide any information associated with channel occupancy. Thus, while the CSI and/or beam measurements may indicate a good signal quality (e.g., a high signal-to-noise ratio (SNR) in the SCell, the channel can be congested. Similarly, with the WUS mechanisms in the DRX mode, the UE can stay in a sleep mode for a long time and the BS may not have any channel occupancy information for the cell in which the UE is operating in a DRX mode. Accordingly, it may be desirable for a UE to report information related to LBT and/or channel occupancy measurements while operating in the dormant mode or DRX mode with inactive configured-on durations.

The present application describes mechanisms for performing channel occupancy measurements while a UE operates in dormant mode or in a DRX mode with inactive configured-on durations. In some aspects, a BS may configure a UE to perform UL LBT measurements while operating in a dormant SCell. One way the UL LBT measurements may be triggered without transmitting data is by scheduling "virtual" UL allocations or transmissions. The BS may also configure the UE to report a UL LB failure detection, for example, via a non-dormant cell (where the UE may have active UL and/or DL communications with the BS. In additional aspects, the BS may also configure the UE to perform DL LBT measurements in the dormant SCell. These can be performed by the UE listening for some pre-configured DL signal (e.g., synchronization signal blocks (SSBs)). The BS may configure the UE to report a DL LBT failure detection, for example, via a non-dormant cell. In additional aspects, the BS may also configure the UE to perform RSSI/CO measurements periodically, or aperiodically in response to a trigger. The BS may also configure the UE to report RSSI/CO measurements, for example, via a non-dormant cell. In additional aspects, the BS may also configure a UE operating in a DRX mode to perform channel occupancy measurements such as UL LBT failure detection, DL LBT failure detection, and/or RSSI/CO measurement during an inactive configured-on duration and report the measurements. These aspects may be used in either independently or in any combination. Additionally, they may be independently configured, or a single configuration can enable multiple measurement types.

Aspects of the present disclosure can provide several benefits. For example, configuring a UE to perform and report channel occupancy related detection and/or measurements (e.g., UL LBT failure detection, DL LBT failure detection, and/or RSSI/CO measurements) in a cell (over a an unlicensed band) while the UE operates in a dormant mode for the cell or in a DRX mode in the cell with frequent inactive configured-on durations can allow a BS to have a better view of the channel occupancy and/or UL interference for the UE in the cell that may otherwise be unknown to the BS. As such, the BS may be able to determine whether to reactivate the UE in the dormant cell and the likelihood of gaining access to channel when the BS has traffic for the UE. Additionally, the BS can balance power efficiency or saving at the UE and activation latency (from dormant mode to non-dormant mode) through configurations of the LBT failure detection and/or channel occupancy measurement occasions.

FIG. 1 illustrates a wireless communications network 100 according to some aspects of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively s geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an aspect, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an aspect, the network 100 may be a NR network deployed over a licensed spectrum and/or an unlicensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an aspect, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an aspect, the network 100 may operate over a shared frequency band or an unlicensed frequency band, for example, at about 3.5 gigahertz (GHz), sub-6 GHz or higher frequencies in the mmWave band. Operations in unlicensed spectrum may include DL transmissions and/or UL transmissions. The network 100 may partition a frequency band into multiple channels or subbands, for example, each occupying about 20 megahertz (MHz).

The BSs 105 and the UEs 115 may be operated by multiple network operating entities sharing resources in the shared or unlicensed frequency spectrum and may perform an LBT procedure (e.g., clear channel assessment (CCA)) prior to communicating to determine whether the channel is available. In an example, the BS 105 may employ an LBT procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods. The BS 105 may perform an LBT in the frequency band prior to transmitting in the frequency band and may transmit in one or more channels based on the LBT result. If the channel is available (performance of the LBT results in an LBT pass), the BS 105 may perform a DL transmission, receive a UL transmission from a UE 115, and/or schedule a UE 115 for data transmission and/or reception within a TXOP. If the channel is not available (performance of the LBT results in an LBT fail), the BS 105 may back off and perform the LBT procedure again at a later point in time.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, a BS 105 can configure a UE 115 to operate in a dormancy bandwidth part (BWP), for example, for power saving. A UE 115 is not expected to perform PDCCH monitoring in the dormancy BWP, and therefore the BS 105 may not configure the UE 115 with a CORESET in the dormancy BWP. In some aspects, channel occupancy measurements are performed on the channel associated with the dormancy BWP, for example, when the dormancy BWP is in an unlicensed band. According to some aspects, performing these measurements may decrease the latency when the BWP is no longer dormant.

In some aspects, a UE 115 may operate in a discontinuous reception (DRX) mode. As discussed above, while in a DRX mode, a UE 115 may periodically monitor for a WUS from the BS 105. If a WUS is received, then data may be transferred between the UE 115 and the BS 105 during the subsequent on duration. Otherwise, the UE 115 "sleeps" and does not communicate with the BS 105, for example, without monitoring for PDCCH.

Figure 2:
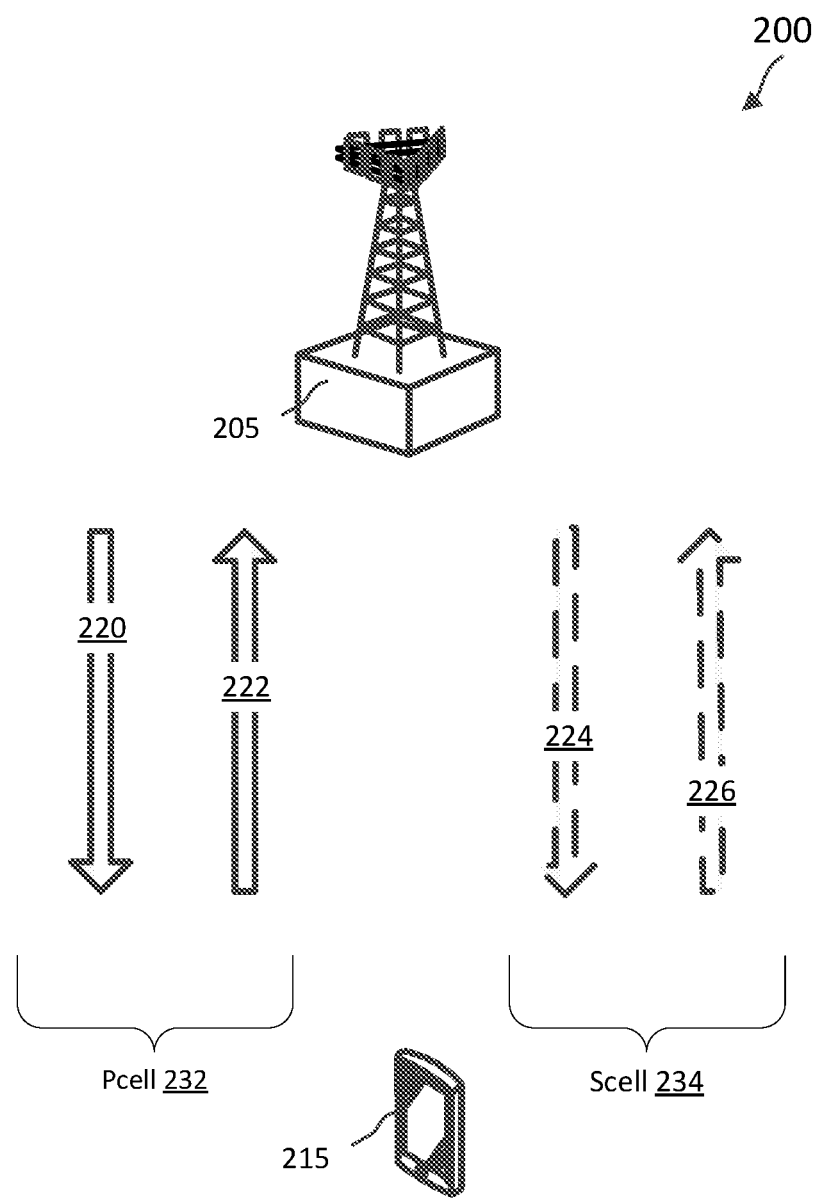
FIG. 2 illustrates a wireless communications network that supports wireless communication over multiple cells according to one or more aspects of the present disclosure.

FIG. 2 illustrates a wireless communications network 200 that supports two cells/bands over which communication between a UE 215 and a BS 205 can be performed. The network 200 may correspond to a portion of the network 100 discussed above. The BS 205 and the UE 215 may correspond to a BS 105 and a UE 115, respectively. According to some aspects, the primary cell (Pcell) 232 can be a licensed frequency band, and the secondary cell (Scell) 234 can be an unlicensed band. The Pcell 232 in some aspects can support both downlink 220 and uplink 222 communication between the UE 215 and the BS 205. The Scell 234 in some aspects can support both downlink 224 and uplink 226 communication between the UE 215 and the BS 205. FIG. 2 illustrates a BS 205 and a UE 215 for purposes of simplicity of discussion, though it will be recognized that aspects of the present disclosure may scale to many more UEs 215 and/or BSs 205. The BS 205 and the UE 215 may be similar to the BS 105 and the UE 115, respectively. Additionally, wireless communications network 200 may operate in unlicensed spectrum that may also be used by other wireless communication devices.

In some instances, DL and UL communications may both be on the same unlicensed band (TDD). For FDD systems, DL and UL may be on separate bands. It is unnecessary for the BS 205 to contend for access to the medium for the licensed band (in the Pcell 232), and the BS 105 may utilize it in addition to the available unlicensed band (in the Scell 234) for transmissions.

The UE may benefit from power savings by having the Scell 234 operating in a dormant. The band can be available for when data does need to be transmitted but be held in one of these modes while waiting for data to be communicated through uplink or downlink. The Pcell 232 can be used for transmitting data when the Scell 234 is not being utilized. In some instances, the BS 205 may also configure the UE 215 to operate in DRX mode in the Pcell 232 and/or in the Scell for power saving. Through this mechanism, power savings can be achieved while still maintaining the necessary bandwidth for when more data needs to be transmitted.

The BS 205 may leverage the unlicensed frequency band to benefit the operation in unlicensed UL and/or DL. For example, when operating in the licensed frequency band (the Pcell 232), the BS may schedule data transmission and/or reception on a more consistent basis because it is unnecessary for the BS 205 to contend for the licensed medium. In other words, the BS 205 is guaranteed to have access to the licensed band (the Pcell 232). The BS 205 may utilize the unlicensed band of the Scell 234 on an ad hoc basis depending on whether the BS desires to include additional data in the unlicensed band of the Scell 234 (e.g., scheduling the UE 215 for a higher BW data transmission). In some aspects, when the BS 205 configures the UE 215 to operate in a dormant mode in the SCell 234, the BS 205 may configure the UE 215 to perform LBT failure detection and/or channel occupancy measurements in the unlicensed band, Scell 234 and report the LBT failure detection and/or channel occupancy measurements in the Pcell 232. Although FIG. 2 illustrates the Pcell 232 operating over a licensed band, it should be understood that in other examples the Pcell 232 can operate over an unlicensed band.

FIGS. 3-7 illustrate various mechanisms for monitoring the channel occupancy associated with a dormant BWP. The x-axis represents time in some arbitrary units. The y-axis represents frequency in some arbitrary units. The schemes 300, 400, 500, 600, and 700 may be employed by the BSs such as 105 and 205 and UEs such as 115 and 215 in a network such as the network 100. In order to avoid latency when data is ready to be transmitted over a dormant BWP, certain measurements may be performed while in a dormant state.

Figure 3:
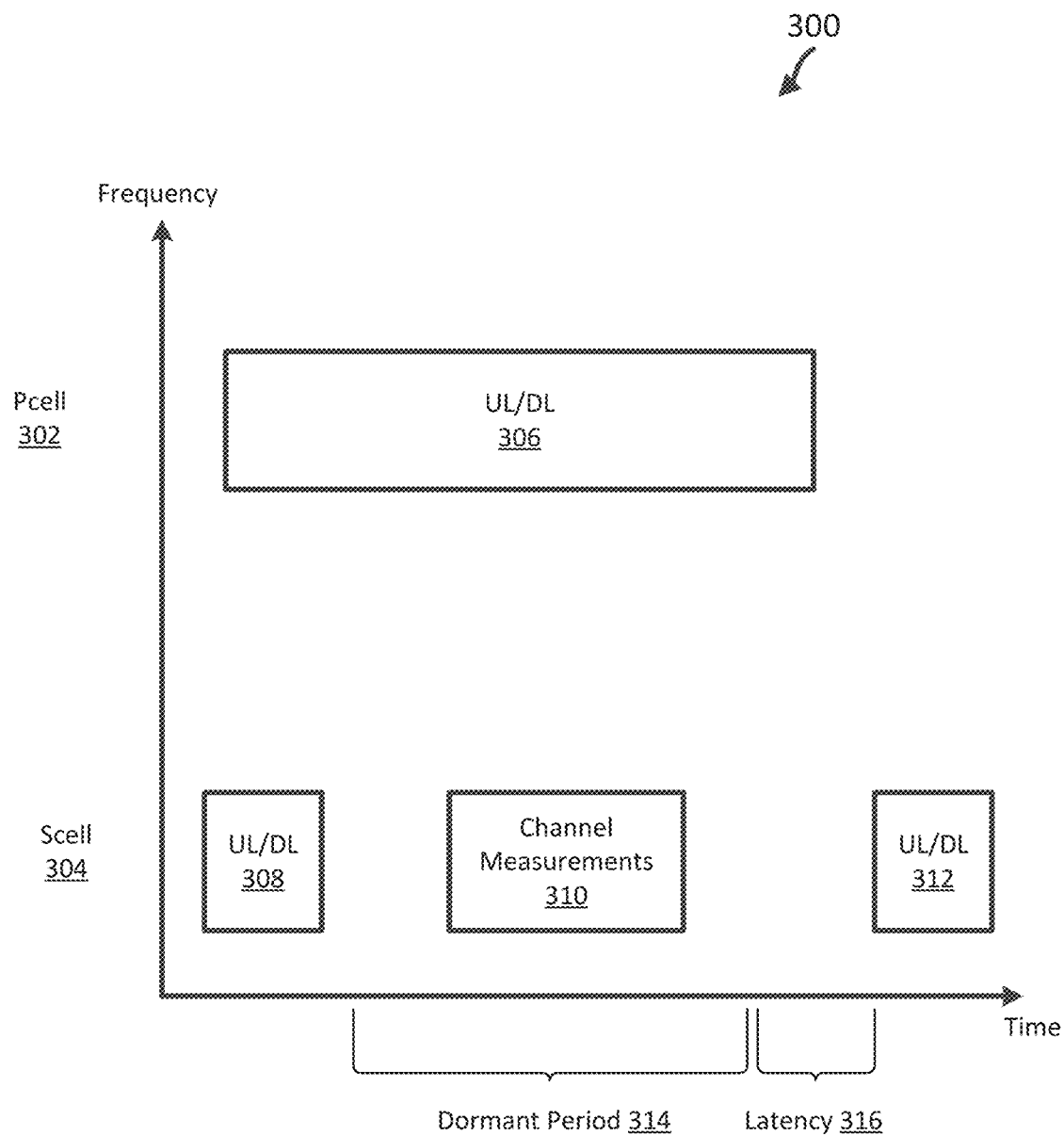
FIG. 3 illustrates a channel measurement scheme for a dormant cell according to one or more aspects of the present disclosure.

FIG. 3 illustrates a measurement scheme 300 according to one or more aspects of the present disclosure. The scheme 300 includes a Pcell 302 and a Scell 304. The Pcell 302 may be substantially similar to the Pcell 232, and the Scell 304 may be substantially similar to the Scell 234. For instance, the Pcell 302 may operate over a licensed band and the Scell 304 may operate over an unlicensed band. The licensed band and the unlicensed band may be in any suitable frequency, such as sub-6 GHz and/or in mmWave bands. In the illustrated example of FIG. 3, the Pcell 302 is active, where the BS 205 and the UE 215 may perform operations including UL and DL transmissions 306. The Scell 304 may initially be active, where the BS 205 and the UE 215 may perform UL/DL transmissions 308. After some time, at time T2, the Scell 304 becomes dormant. For instance, the BS 205 may configure the UE 215 to operate in the dormant mode in the Scell 304, for example, to save power when traffic for the UE 215 is light. During the dormant period 314, the Scell 304 is not used to communicate between the UE 215 and the BS 205. However, channel measurements 310 may be performed so that the channel may continue to be characterized for when the Scell 304 is no longer dormant. Channel measurements can include CSI measurements, AGC, and beam management (e.g., for beam failure detection (BFD) and/or beam failure recovery (BFR)). By performing channel measurements during the dormant state, the UE can achieve power savings by remaining dormant, but maintain a low activation latency. When the Scell 304 leaves the dormant period 314 and transition to a non-dormant or active mode, there is a latency 316 before UL and DL transmissions 312 may resume. The latency 316 can be caused by a number of factors, including re-characterizing the channel and determining the channel occupancy before transmission in the Scell 304.

Figure 4:
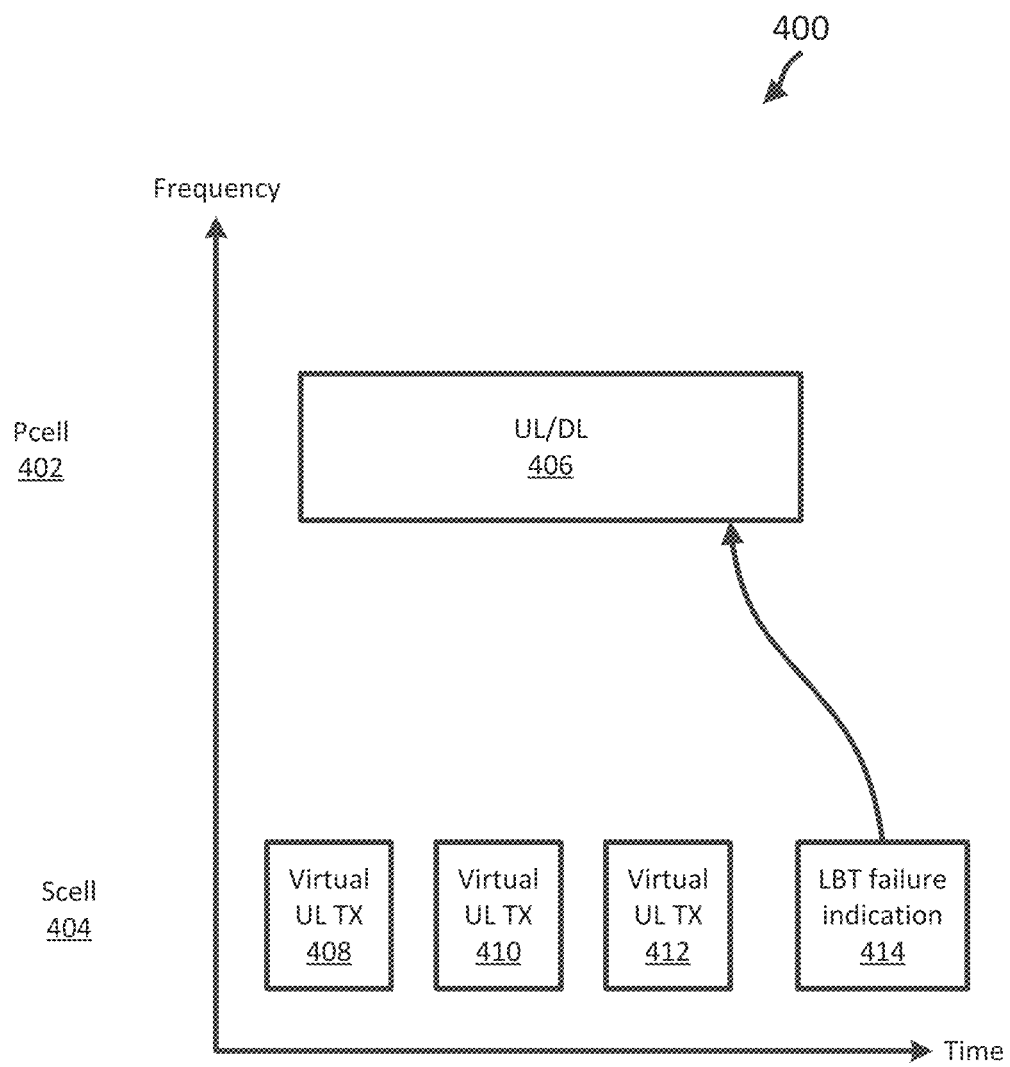
FIG. 4 illustrates an uplink (UL) listen-before-talk (LBT) failure detection and reporting scheme for a dormant cell according to one or more aspects of the present disclosure.

FIG. 4 illustrates an UL LBT failure detection and reporting scheme 400 for a dormant cell according to one or more aspects of the present disclosure. The scheme 400 illustrates scheduled Virtual UL TX transmissions. The scheme 400 includes a Pcell 402 and a Scell 404. The Pcell 402 may be substantially similar to the Pcells 232 and/or 302, and the Scell 404 may be substantially similar to the Scell 234 and/or 304. For instance, the Pcell 402 may operate over a licensed band and the Scell 404 may operate over an unlicensed band. The Scell 404 in scheme 400 is in a dormant state. While the Scell 404 is dormant, the UE 215 will not monitor the PDCCH for the Scell 404. During the dormant state, there is a desire to perform LBT measurements periodically. The BS 205 may configure the UE 215 to perform "virtual" UL transmit (TX) operations, such as Virtual UL TXs 408, 410, and 412. These virtual UL TX operations are "virtual" in that the UE 215 does not transmit any signals to the BS. Rather, the virtual UL TX operations are used to trigger the UE 215 to perform an LBT measurement. Thus, the Virtual UL TXs 408, 410, and 412 are virtual UL allocations, which may include a certain time-frequency resources (e.g., RBs). For instance, the UE 215 may perform an LBT measurement in each Virtual UL TXs 408, 410, and 412 UL. The LBT measurements can be based on energy detection as discussed above in relation to FIG. 1. For instance, the UE 215 may determine whether an LBT is a pass or fail based on whether the channel measurement exceeds an energy detection threshold or not. In some instances, the LBT measurements may be based on a CAT 2 LBT. In some other instances, the LBT measurements may be based on a CAT4 LBT. If the LBT measurement fails (e.g. the channel is occupied by another transmitter), then the UE 215 may report an LBT failure indication 414 to the BS 205 through any available serving cell that is non-dormant or active, including the Pcell 402.

The LBT measurements can be performed in addition to any other measurements such as CSI measurements, AGC, and beam management if configured. CSI measurements may give some indication of signal quality on the channel, but does not directly translate to whether the UE can pass LBT for UL transmission, or whether the UE is subject to hidden node interference. The configuration setting that is used to control whether UL LBT failure detection is performed may be the same setting or a separate setting from that used to control whether CSI measurements and/or beam management is performed. In other words, the BS 205 may configure the UE 215 via a single configuration (e.g., an RRC configuration) for all measurements including CSI, AGC, beam, UL LBT failure detection or via separate configurations, one configuration for CSI, AGC, and/or beam and another configuration for LBT failure detection. Similarly, the BS 205 may configure the UE 215 to report CSI, AGC, beam, and/or UL LBT failure detection in a joint report or separate reports.

Figure 5:
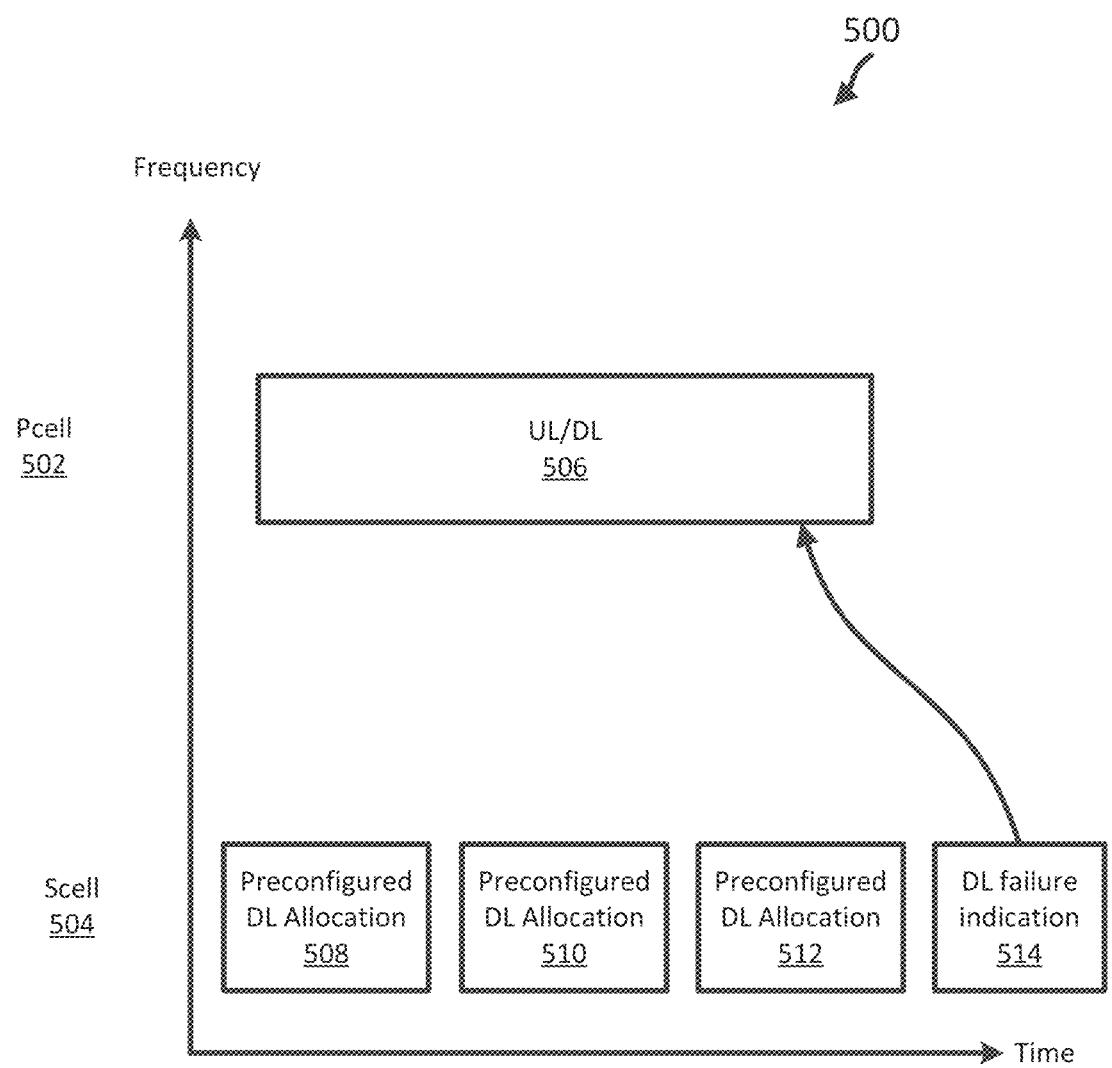
FIG. 5 illustrates a downlink (DL) LBT failure detection and reporting scheme for a dormant cell according to one or more aspects of the present disclosure.

FIG. 5 illustrates a DL LBT failure detection and reporting scheme 500 for a dormant cell according to one or more aspects of the present disclosure. The scheme 500 illustrates DL channel occupancy measurements are performed by listening for preconfigured DL messages in a dormant Scell. The scheme 500 includes a Pcell 502 and a Scell 504. The Pcell 402 may be substantially similar to the Pcells 232, 302, and/or 402, and the Scell 504 may be substantially similar to the Scell 234, 304, and/or 404. For instance, the Pcell 502 may operate over a licensed band and the Scell 504 may operate over an unlicensed band. UL/DL transmissions 506 may be performed in the active Pcell 502. Scell 504 is in a dormant state. While in this dormant state, DL allocations may be preconfigured for Scell 504, such as preconfigured DL allocations 508, 510, and 512, which may include a certain time-frequency resources (e.g., RBs). In some instances, the preconfigured DL allocations are associated with SSB transmissions. In some instances, the preconfigured DL allocations are associated with DL DMRS transmissions. In general, the preconfigured DL allocations are for DL transmissions irrespective of whether a UE 215 is actively communicating with the BS 205. The preconfigured DL allocations are known to the UE 215 or preconfigured for the UE 215 by the BS 205. Each preconfigured DL allocation allows the UE 215 to listen to the preconfigured DL signal and thereby perform a channel occupancy measurement such as a DL LBT measurement. For instance, the UE 215 may monitor for the preconfigured DL signal from the BS 205. In the case of a DL failure (to detect the preconfigured DL signal), the UE 215 may report the DL failure indication 514 to the BS 205 through any available serving cell, including the Pcell 502. The DL failure indication 514 can provide the BS 205 with information associated with interference from the UE 215 perspective. For instance, there may be a strong interferer nearby the UE 215. Thus, while the BS 205 may successfully gain channel access to transmit a preconfigured DL signal, the UE 215 may fail to receive the preconfigured DL signal. Accordingly, the DL failure indication 514 may provide the BS 205 with hidden node that may otherwise be undetected by the BS 205.

The scheme 500 is similar to the scheme 400, but rather than UL LBT failure detection, DL LBT failure detection is performed. The DL an UL failure detection in a dormant Scell can be configured separately or jointly. For instance, the BS 205 may configure the UE 215 to perform the UL LBT failure detection and the DL failure detection in a dormant cell in a single configuration (e.g., RRC configuration) or in separate configurations (e.g., RRC configurations). As in scheme 400, CSI measurements and beam management may also be configured separately or jointly with UL and/or DL LBT failure detection. Similarly, the DL and UL LBT failure detection report can be sent separately or jointly. As with other aspects described herein, aspects illustrated in FIGS. 4 and 5 can be performed independently or jointly.

Figure 6:
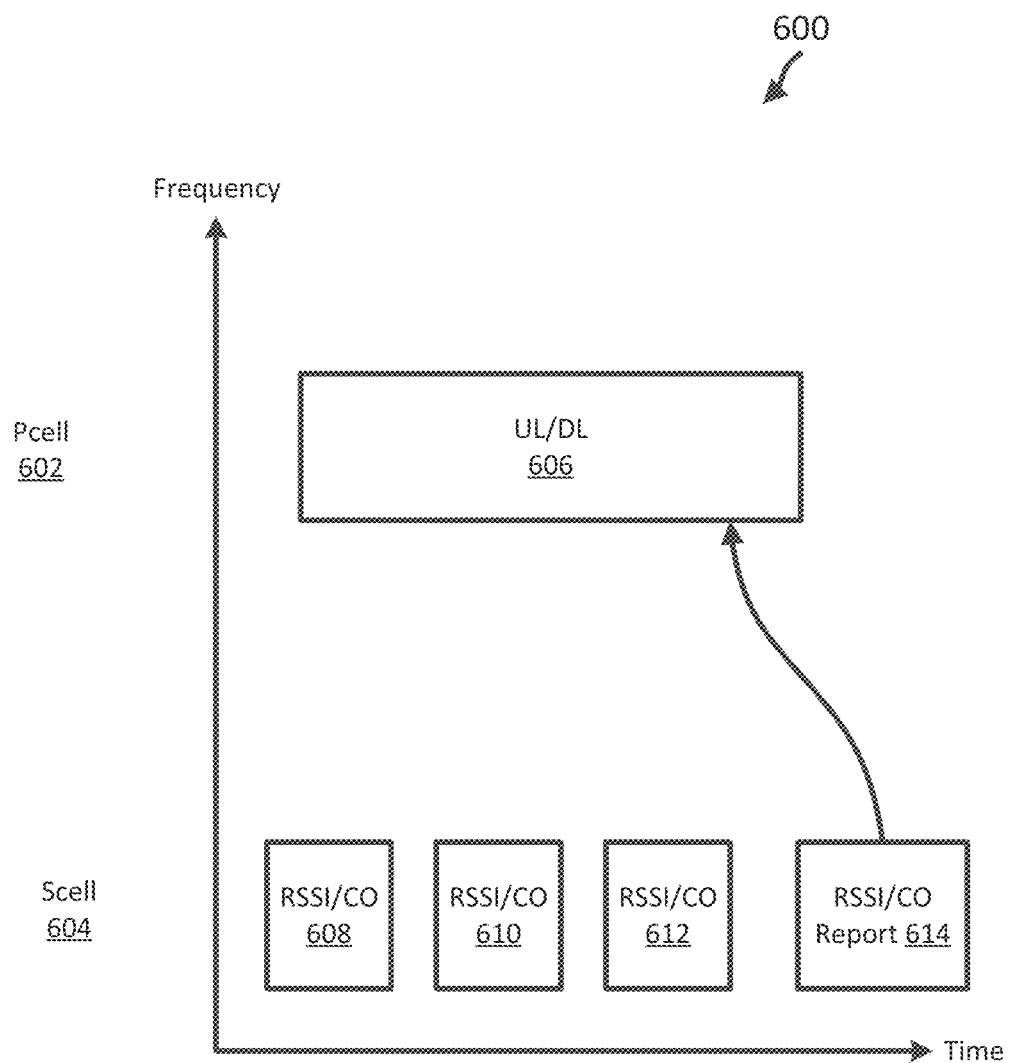
FIG. 6 illustrates a received signal strength indicator (RSSI)/channel occupancy (CO) measurement and reporting scheme for a dormant cell according to one or more aspects of the present disclosure.

FIG. 6 illustrates a RSSI/CO measurement and reporting scheme 600 for a dormant cell according to one or more aspects of the present disclosure. In the scheme 600, besides DL or UL LBT failure detection, in some aspects, a UE 215 can also be configured to perform RSSI and CO measurements in a dormant Scell. As shown, the scheme 600 includes a Pcell 602 and a Scell 604. The Pcell 602 may be substantially similar to the Pcells 232 and 302, 402, and/or 502, and the Scell 604 may be substantially similar to the Scell 234, 304, 404, and/or 504. For instance, the Pcell 602 may operate over a licensed band and the Scell 604 may operate over an unlicensed band. These measurements in some aspects may be performed alone, or in addition to other measurements. As such, the scheme 600 illustrates an active Pcell 602 performing UL/DL operations 606. The BS 205 may configure the UE 215 to perform periodic RSSI/CO measurements such as RSSI/CO measurements 608, 610, and 612 in certain time-frequency resources, which may be referred to as RSSI/CO measurement occasions. RSSI/CO measurements such as RSSI/CO in the SCell 604. For instance, the UE 215 may determine an RSSI by measuring a signal energy in the channel. The signal can be from any nodes. In other words, the RSSI may provide an indication of the strength of an interferer. In some instance, the UE 215 may determine the CO by determining an amount of time (in certain unit) that RSSI measurements exceeding a threshold over a measurement window or duration, for example, based on a RSSI measurement timing configuration (RMTC) or CO configuration provided by the BS 205. The UE 215 may report the report 614 may be reported to the BS after each measurement, on some other schedule, or as requested by the BS. The UE 215 may report the RSSI/CO Report 614 to the BS 205 through any available serving cell, including the Pcell 602.

Figure 7:
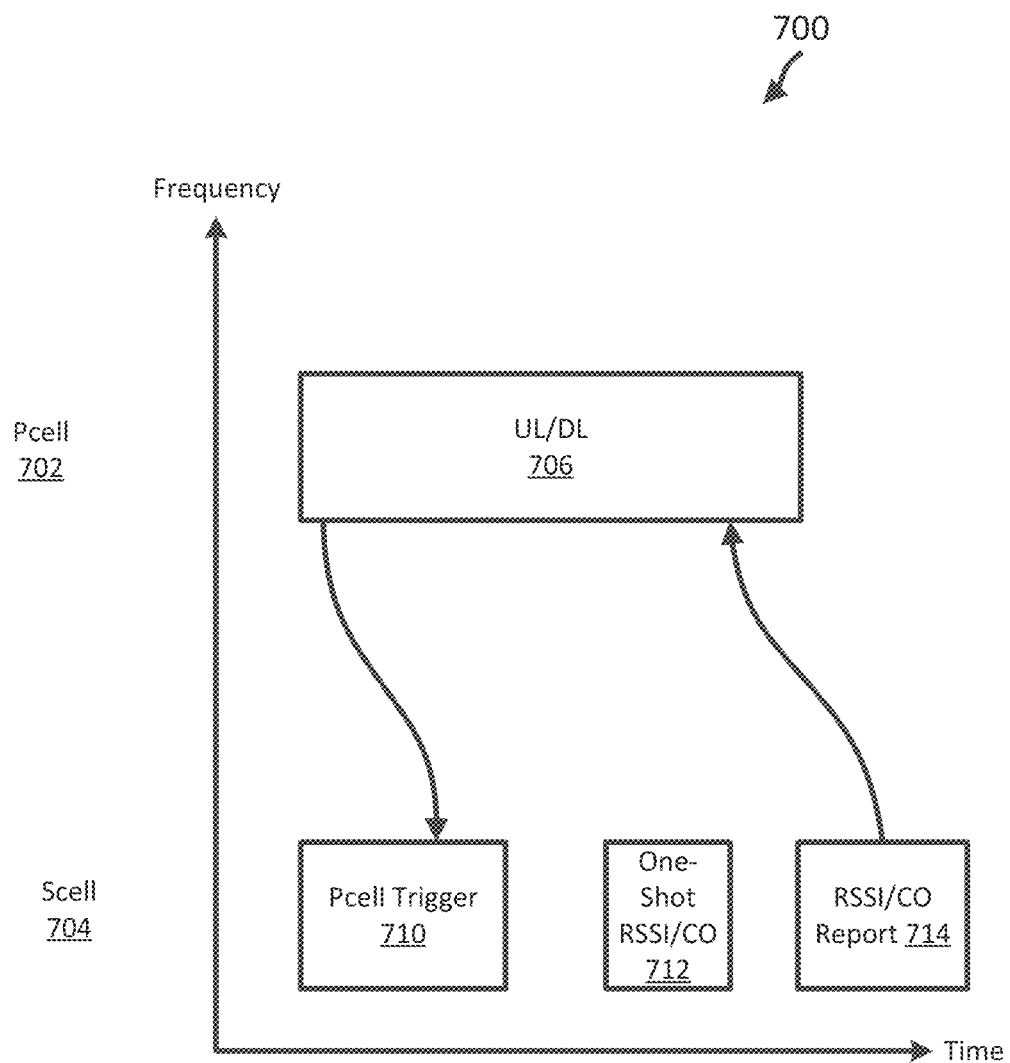
FIG. 7 illustrates a RSSI/CO measurement and reporting scheme for a dormant cell according to one or more aspects of the present disclosure.

FIG. 7 illustrates a RSSI/CO measurement and reporting scheme 700 for a dormant cell according to one or more aspects of the present disclosure. In the scheme 700, a UE 215 performs one-shot RSSI/CO measurements in a dormant Scell. The scheme 700 includes a Pcell 702 and a Scell 704. The Pcell 702 may be substantially similar to the Pcells 232 and 302, 402, 502, and/or 602, and the Scell 704 may be substantially similar to the Scell 234, 304, 404, 504, and/or 604. For instance, the Pcell 702 may operate over a licensed band and the Scell 704 may operate over an unlicensed band. Pcell 702 can maintain UL/DL 706 as it is an active cell. Scell 704 is in a dormant state. While in this dormant state, the BS 205 can send a Pcell Trigger 710 message through Pcell 702. The Pcell Trigger 710 causes the UE 215 to perform a one-shot RSSI/CO 712 measurement in Scell 704. The BS 205 may determine when the Pcell Trigger 710 message is sent to the UE 215. The BS 205 may send the PCell Trigger 710 message in anticipation of or in conjunction with activating Scell 704. In response to the PCell Trigger 710, the UE 215 performs one-shot RSSI/CO 712 measurement in Scell 704. The one-shot shot RSSI/CO 712 measurement may refer to an RSSI/CO measurement within one time duration rather than performing it periodically as in the scheme 600 discussed above in FIG. 6. Following the measurement 712, the UE 215 reports the measurements in a RSSI/CO Report 714 to the BS 205. The UE 215 may report the RSSI/CO Report 714 can to the BS 205 through any available serving cell, including the Pcell 702. Such one-shot RSSI/CO measurements can be performed independently or in addition to other measurements described herein.

In some aspects, the BS 205 may utilize the one-short RSSI/CO measurement scheme 700 shortly before switching the UE 215 to a non-dormant mode from the dormant mode in the Scell 704. For instance, if the RSSI/CO indicates that the Scell 704 has a high likelihood (e.g., the channel is un-congested and interference is weak) for the BS 205 to gain channel access in the Scell 704 and communicate with the UE 215, the BS 205 may proceed with the switching. If the RSSI/CO indicates that the Scell 704 has a low likelihood (e.g., the channel is congested and interference is strong) for the BS 205 to gain channel access and communicate with the UE 215, the BS 205 may not proceed with the switching. Accordingly, the one-shot RSSI/CO measurement can further avoid having the BS 205 switching the UE 215 to the dormant mode in the Scell 704 and failing to gain access to the channel.

Figure 8:
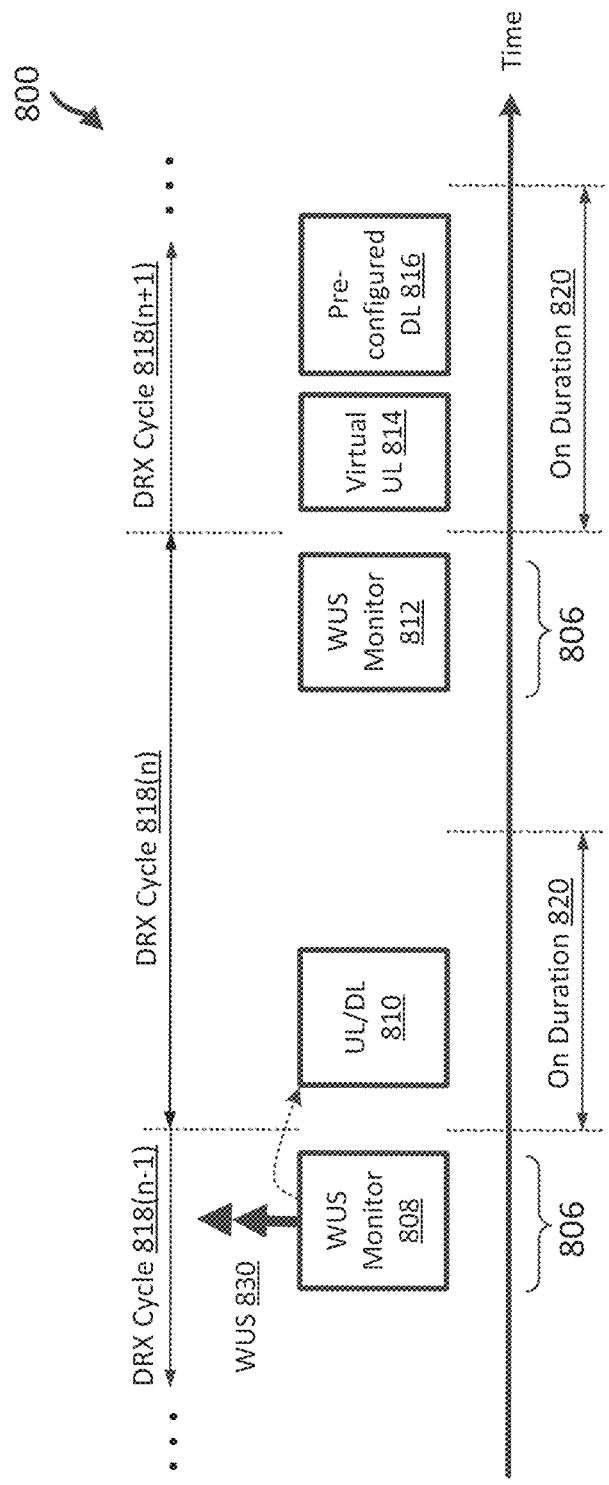
FIG. 8 illustrates an LBT failure detection and RSSI/CO measurement scheme for an inactive discontinuous reception (DRX) configured-on duration according to one or more aspects of the present disclosure.

FIG. 8 illustrates an LBT failure detection and RSSI/CO measurement scheme 800 for an inactive DRX configured-on duration according to one or more aspects of the present disclosure. The x-axis represents time in some arbitrary units. The y-axis represents frequency in some arbitrary units. The scheme 800 may be employed by the BSs such as 105 and 205 and UEs such as 115 and 215 in a network such as the network 100 for communications. In the scheme 800, a BS 205 may configure a UE 215 to perform channel occupancy measurements during inactive configured-on durations of a DRX cycle. DRX Cycle 818 is comprised of an On Duration 820 during which a UE 215 may potentially transmit UL data or receive DL data. The DRX cycle 818 and/or the On Duration 820 may have any suitable durations. The DRX cycle 818 may be periodic (shown as 818(*n*−1), 818(*n*) and 818(*n*+1)). Each On Duration 820 is preceded by a WUS Monitor period 806, which may also be referred to as a WUS monitoring occasion. The gap between a WUS Monitor period 806 and an on-duration 820 may be relatively small (e.g., in the order of 2-3 ms). The gap may provide time for the UE 215 to switch on its additional frontend components (e.g., at an RF such as the RF unit 1214 shown in FIG. 12) upon a detection of a WUS. During a WUS Monitor period 806, the UE 215 may perform WUS Monitor 808 preceding the On Duration 820 of the DRX cycle 818(*n*), if a WUS is received, then the following On Duration 820 is active. For example, as shown in FIG. 8, the UE 215 receives a WUS 830 during WUS Monitor 808 allows for UL/DL 810 to occur during On Duration 820 in the DRX cycle 818(*n*). At the end of a On Duration 820, the UE 215 may enter a lower mode or sleep mode for the remaining time of the DRX cycle 818(*n*). The lack of a WUS during WUS Monitor 812 means UL/DL does not occur during the subsequent On Duration 820 of the DRX cycle 818(*n*+1).

According to some aspects, an inactive On Duration of a DRX cycle can be utilized to make certain channel occupancy measurements, similar to those done in previously described aspects. For example, a Virtual UL allocation 814 can be configured such that an UL LBT measurement is performed during the inactive On Duration 820 in the DRX cycle 818(*n*+1). In addition, a DL LBT measurement can be performed by listening for a Pre-configured DL 816 (e.g., based on a preconfigured DL allocation) during the inactive On Duration 820 in the DRX cycle 818(*n*+1). In some aspects, the BS 205 may also configure the UE 215 to perform RSSI/CO measurements as discuss above in relation to FIGS. 6 and 7. The BS 205 may configure the UE 215 to perform any combination of the UL LBT failure detection (based on the Virtual UL allocation 814), DL LBT failure detection (based on the Pre-configured DL 816), and/or RSSI/CO measurements. In some aspects only the UL LBT measurement is configured, in other aspects only the DL LBT measurement is configured, in other aspects only RSSI/CO measurement is configured, in some other aspects both UL and DL LBT measurements are configured, and in some aspects all UL LBT, DL LBT, and RSSI/CO measurements are configured. In some aspects, the UL LBT, DL LBT, and RSSI/CO measurements are independently configurable, and in some aspects they share a single configuration.

In some aspects, a BS 205 may configure a UE 215 to perform any combinations of the schemes 400, 500, 600, 700, and/or 800 discussed above in relation to FIG. 4, 5, 6, 7, or 8, respectively. In some aspects, the BS 205 may transmits a configuration for the UE to perform UL LBT failure detection, DL LBT failure detection, RSSI/CO measurements in a cell while the UE operates in a dormant mode for the cell or in a DRX mode for the cell. The configuration may indicate virtual UL allocations, DL preconfigured allocations, and/or RSSI/CO measurement occasions. The configuration may also include an indication indicating whether the UE is to perform the perform UL LBT failure detection, DL LBT failure detection, RSSI/CO measurements while in the dormant mode or during an inactive configured-on duration while in the DRX mode. The indication can include multiple bits each enabling one of the UL LBT failure detection, DL LBT failure detection, RSSI/CO measurements. For example, a bit value of 1 may enable a corresponding measurement or indication, and a bit value of 0 may disable a corresponding measurement or indication. In some aspects, the configuration may be in the same configuration as a CSI/beam measurement configuration. In some other aspects, the BS 205 may configure the UE 215 in a separate configuration for each type of measurements. Similarly, the BS 205 may configure the UE 215 to utilize a joint report to report all measurement types (e.g., LBT failure detection, DL LBT failure detection, RSSI/CO measurements) or utilize separate reports for the different types of measurements.

Figure 9:
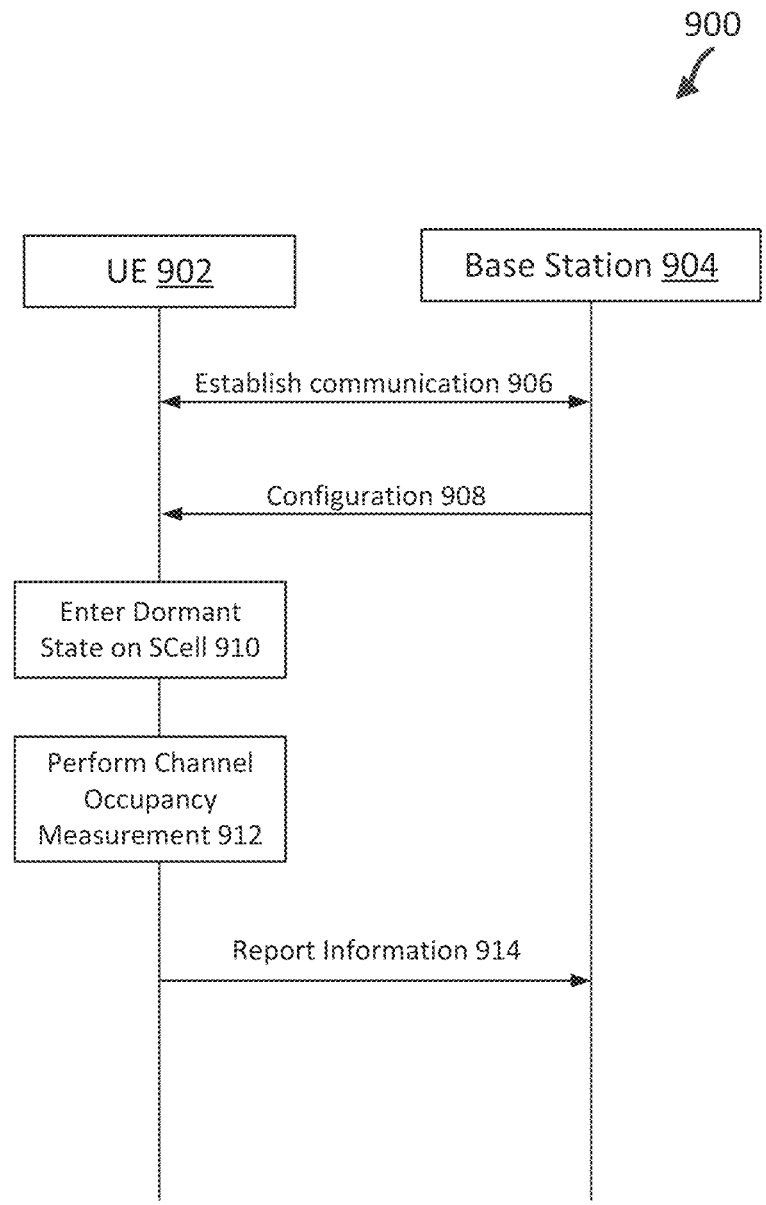
FIG. 9 illustrates an LBT failure detection and RSSI/CO measurement scheme for a dormant cell according to one or more aspects of the present disclosure.

FIG. 9 illustrates an LBT failure detection and RSSI/CO measurement scheme 900 for a dormant cell according to one or more aspects of the present disclosure. The scheme 900 is implemented between a UE 902 (e.g., the UEs 115 and/or 215) and a BS 904 (e.g., the BSs 105 and/or 205). In the scheme 900, the BS 904 configures the UE 902 to perform channel occupancy measurements while the UE 902 operates in a dormant mode.

At action 906, the UE 902 and the BS 904 establish a communication. For instance, the UE 902 may establish an RRC connection with the BS 904 for communication by performing a random access procedure as discussed above in relation to FIG. 1.

At action 908, the BS 904 configures the UE 902 with a configuration for performing channel occupancy measurements in a dormant cell. The configuration may include information, such as when to perform a channel occupancy measurement, and what type of measurement to perform. In some instances, the configuration may include a configuration for virtual UL allocations as shown in the scheme 400 discussed above in relation to FIG. 4. In some instances, the configuration may include a configuration for preconfigured DL allocations as shown in the scheme 500 discussed above in relation to FIG. 5. In some instances, the configuration may include a configuration for RSSI/CO occasions as shown in the scheme 600 discussed above in relation to FIG. 6.

At action 910, some time after the configuration, the UE 902 enters a dormant state for the Scell. For instance, the BS 904 may transmit a configuration to configure the UE to enter the dormant state. The UE 902 may stop PDCCH monitoring in the Scell.

At action 912, while in the dormant state, the UE 902 performs a channel occupancy measurement. The channel occupancy measurement is performed as configured by the configuration at action 908. This channel occupancy measurement can be any of the measurements described previously such as UL LBT measurement in the scheme 400, and DL LBT measurement in the scheme 500, and RSSI/CO measurement in the schemes 600 and/or 700.

At action 914, after the measurement has been performed, the UE 902 reports the information associated with the measurement. In some aspects, the UE 902 may send the report to the BS 904 when the UE 902 detects a failure condition (e.g., an UL LBT failure, a DL LBT failure, and/or a RSSI/CO exceeding a certain channel occupancy threshold).

Figure 10:
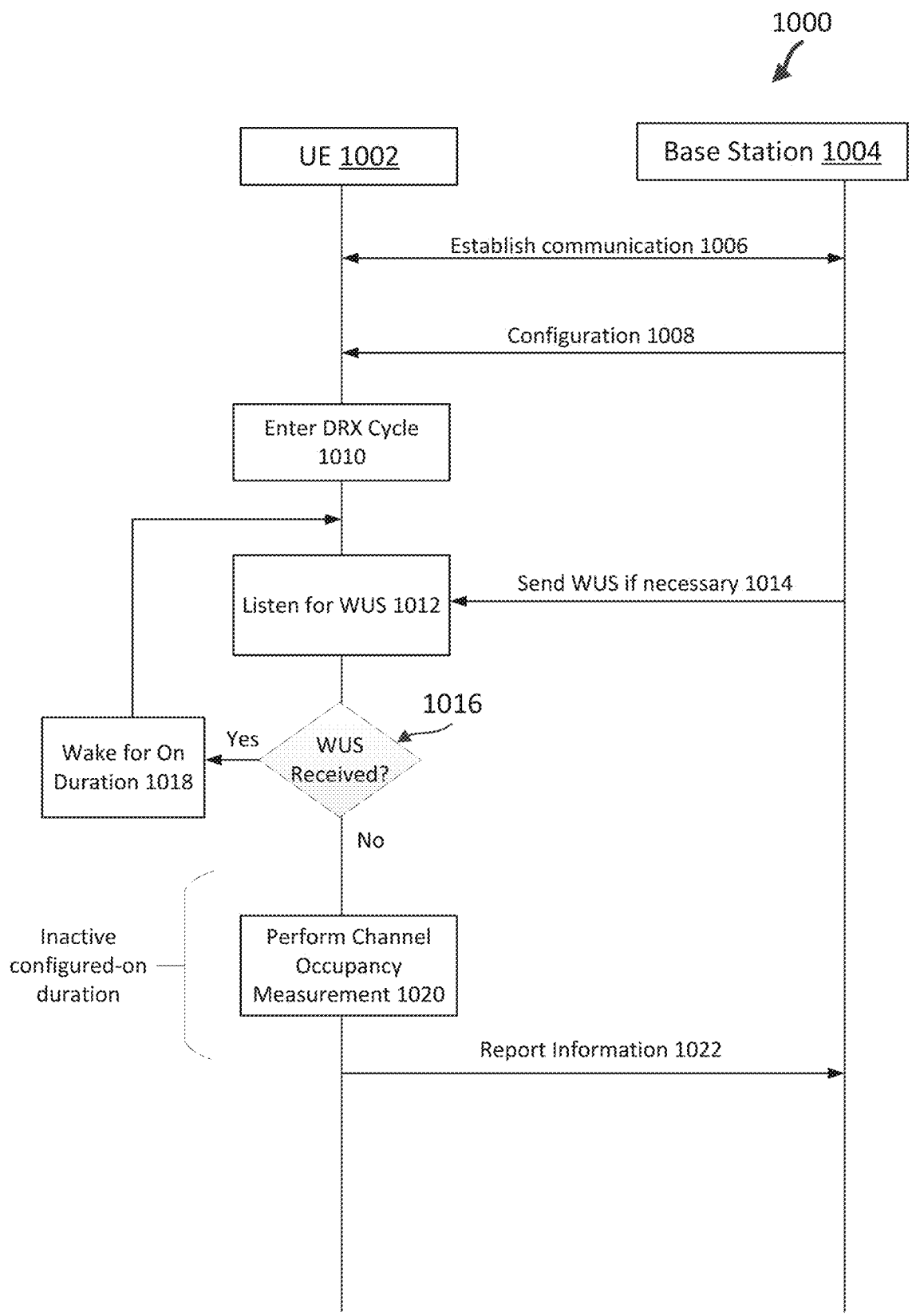
FIG. 10 illustrates an LBT failure detection and RSSI/CO measurement scheme for an inactive DRX configured-duration according to one or more aspects of the present disclosure.

FIG. 10 illustrates an LBT failure detection and RSSI/CO measurement scheme 1000 for an inactive DRX configured-on duration according to one or more aspects of the present disclosure. The scheme 1000 is implemented between a UE 1002 (e.g., the UEs 115, 215, and/or 902) and a BS 1004 (e.g., the BSs 105, 205, and/or 904). In the scheme 1000, the BS 1004 configures the UE 1002 to perform channel occupancy measurements while the UE 1002 operates in a DRX mode.

At action 1006, the UE 1002 and the BS 1004 establish a communication. For instance, the UE 1002 may establish an RRC connection with the BS 1004 for communication by performing a random access procedure as discussed above in relation to FIG. 1.

At action 1008, the BS 1004 configures the UE 1002 with a configuration for performing channel occupancy measurements while in a DRX mode. The configuration may include information, such as when to perform a channel occupancy measurement, and what type of measurement to perform. In some instances, the configuration may include a configuration for virtual UL allocations as shown in the scheme 400 discussed above in relation to FIG. 4. In some instances, the configuration may include a configuration for preconfigured DL allocations as shown in the scheme 500 discussed above in relation to FIG. 5. In some instances, the configuration may include a configuration for RSSI/CO occasions as shown in the scheme 600 discussed above in relation to FIG. 6. Some of the measurement occasions (e.g., the virtual UL allocations, the preconfigured DL allocations, and/or the RSSI/CO measurement occasions) may fall within an inactive DRX configured duration, for example, as shown in the scheme 800 discussed above in relation to FIG. 8.

At action 1010, some point after the configuration, the UE 1002 may enter a DRX Cycle (e.g., the DRX cycle 818).

At action 1012, during the DRX cycle, the UE 1002 listens for a WUS (e.g., the WUS 830) in the channel. For instance, the WUS may have a certain waveform and the UE 1002 may compute a correlation between a signal captured from the channel and the WUS waveform to determine whether a WUS is presence.

If the BS 1004 desires the UE 1002 to become active, for example, due to traffic for the UE 1002, the BS 1004 transmits a WUS signal at action 1014.

At decision block 1016, the UE 1002 determines if a WUS was received. If a WUS was received, then the UE wakes up for the on duration at action 1018. For instance, the UE 1002 may power-on or switch frontend components at the UE 1002's frontend to active. During the On Duration, the UE 1002 may monitor for PDCCH from the BS 1004 and perform any UL/DL communications or other operations during the wake period. At the end of the wake period or on duration, the UE 1002 repeats the DRX cycle and returns to action 1012 to listen for a next WUS.

If no WUS is received at decision block 1016, the UE 1002 may determine whether a channel occupancy measurement occasion (e.g., a virtual UL allocation, a preconfigured DL allocation, or an RSSI/CO occasion) is within the upcoming On Duration. Since no WUS is received for the upcoming On Duration, the On Duration may be referred to as an inactive configured-on duration. If there is a channel occupancy measurement occasion configured in the inactive configured-on duration, the UE 1002 perform channel occupancy measurement at action 1020. In other words, this channel occupancy measurement occurs during the inactive configured-on duration. The measurement is performed according to the configuration performed at action 1008. The channel occupancy may include an UL LBT measurement triggered by a virtual UL transmission as discussed above in relation to FIG. 4. It could also include, or only include, a DL LBT measurement performed by listening for a preconfigured DL signal as discussed above in relation to FIG. 5.

At action 1022, after performing the measurement, the UE 1002 can report to the BS 1004 information based on the measurement or measurements. In some aspects, the UE 1002 may send the report to the BS 1004 when the UE 1002 detects a failure condition (e.g., an UL LBT failure, a DL LBT failure, and/or a RSSI/CO exceeding a certain channel occupancy threshold).

When multiple of the UL LBT, DL LBT, RSSI/CO measurements are performed, the UE 1002 may report the measurement information either together in a joint report or separately in separate reports.

Figure 11:
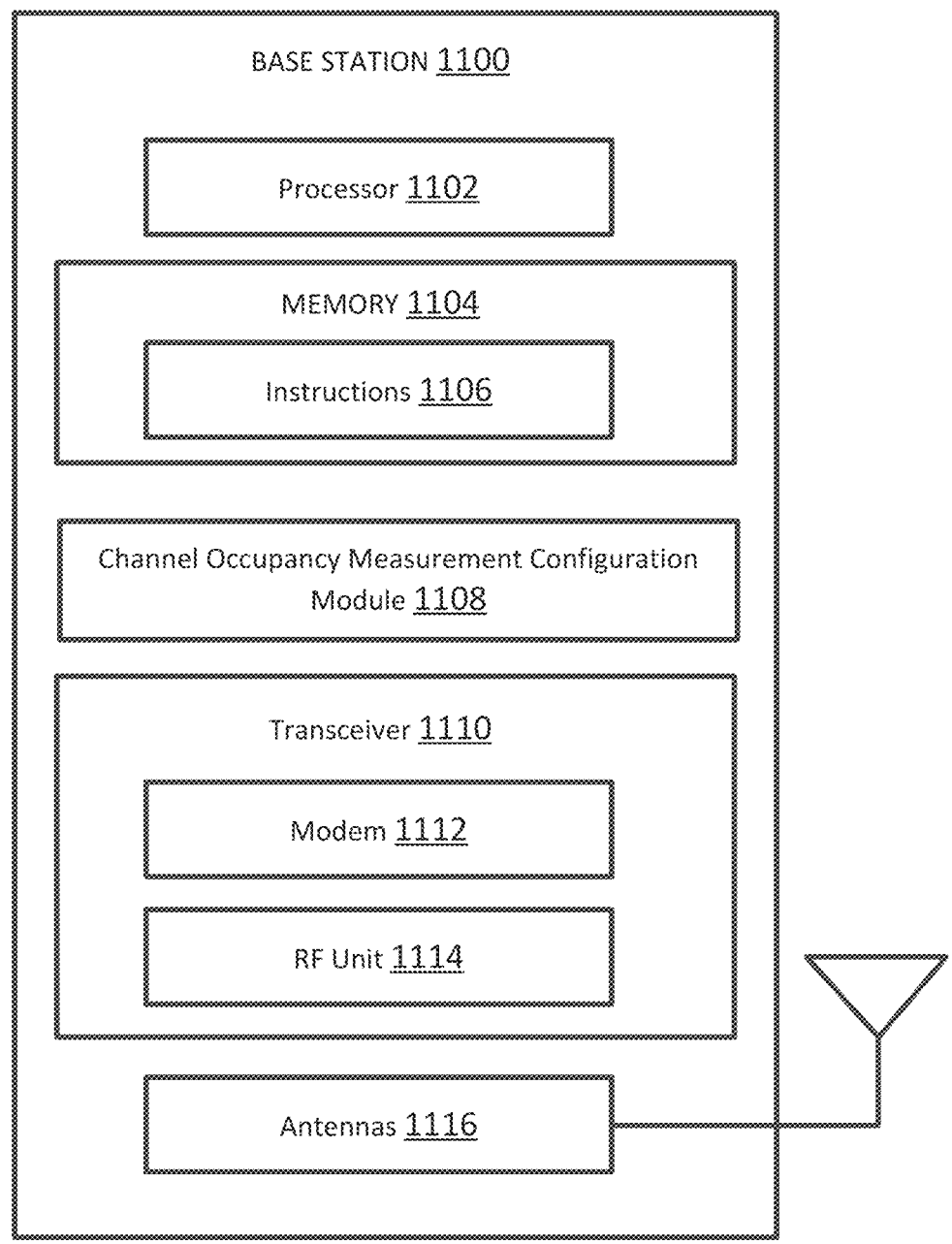
FIG. 11 is a block diagram of an exemplary base station (BS) according to one or more aspects of the present disclosure.

FIG. 11 is a block diagram of an exemplary BS 1100 according to one or more aspects of the present disclosure. The BS 1100 may be a BS 105, BS 205, BS 904, BS 1004 as discussed above in FIGS. 1-10. As shown, the BS 1100 may include a processor 1102, a memory 1104, a channel occupancy measurement module 1108, a transceiver 1110 including a modem subsystem 1112 and a radio frequency (RF) unit 1114, and one or more antennas 1116. These elements may be in direct or indirect communication with each other, for example via one or more buses.

The processor 1102 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an aspect, the memory 1104 includes a non-transitory computer-readable medium. The memory 1104 may store instructions 1106. The instructions 1106 may include instructions that, when executed by the processor 1102, cause the processor 1102 to perform the operations described herein, for example, aspects of FIGS. 3-10. Instructions 1106 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel occupancy measurement module 1108 may be implemented via hardware, software, or combinations thereof. For example, the channel occupancy measurement module 1108 may be implemented as a processor, circuit, and/or instructions 1106 stored in the memory 1104 and executed by the processor 1102. In some examples, the channel occupancy measurement module 1108 can be integrated within the modem subsystem 1112. For example, the channel occupancy measurement module 1108 can be implemented by a combination of software components (e.g., executed by a DSP or a general processor) and hardware components (e.g., logic gates and circuitry) within the modem subsystem 1112.

The channel occupancy measurement module 1108 may be used for various aspects of the present disclosure. The channel occupancy measurement module 1108 can be used to configure a UE to perform channel occupancy measurements of differing types and under differing conditions, and receive reports from the UE as described herein, such as aspects of FIGS. 3-10. In some aspects, the channel occupancy measurement module 1108 is configured to transmit, to a UE (e.g., the UEs 115, 215, 902, and/or 1002), an LBT failure detection configuration associated with at least one of a dormant mode or a DRX cycle in a first cell. In some aspects, the first cell is a Scell in an unlicensed band. The configuration may include which type of measurements to perform, when they are to be performed, and what results should be reported back. The LBT failure detection can be based on UL and/or DL LBT measurements as in the schemes 400, 500, and 800 discussed above in relation to FIGS. 4, 5, and 8, respectively. The channel occupancy measurement module 1108 is also configured to receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle. In some aspects, the report includes an indication of an UL and/or DL LBT failure.

In some aspects, the channel occupancy measurement module 1108 may also be configured to configure the UE to perform periodic RSSI/CO measurements at intervals triggered by RSSI/CO measurement occasions and/or aperiodic RSS/CO measurement in a cell while the UE is in a dormant mode in the cell or during an inactive DRX configure on-duration and receive reports from the UE of RSSI/CO measurements through an active or non-dormant cell as in the schemes 600, 700, and 800 discussed above in relation to FIGS. 6, 7, and 8, respectively.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data from the memory 1104, and/or the channel occupancy measurement module 1108 according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configurations, channel occupancy measurement configuration, an LBT failure detection configuration, dormant mode configuration, DRX mode configuration, SSBs, reference signals, DMRSs) from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the BS 1100 to enable the BS 1100 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., UL LBT failure detection indication, DL LBT failure detection indication, RSSI/CO report) to the channel occupancy measurement module 1108 for processing. The antennas 1116 may include multiple antennas of similar or different designs in order to sustain multiple transmission links.

In some aspects, the transceiver 1110 is configured to communicate with components of the BS 1100 to transmit, to a UE, an LBT failure detection configuration associated with at least one of a dormant mode or a DRX cycle in a first cell and receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
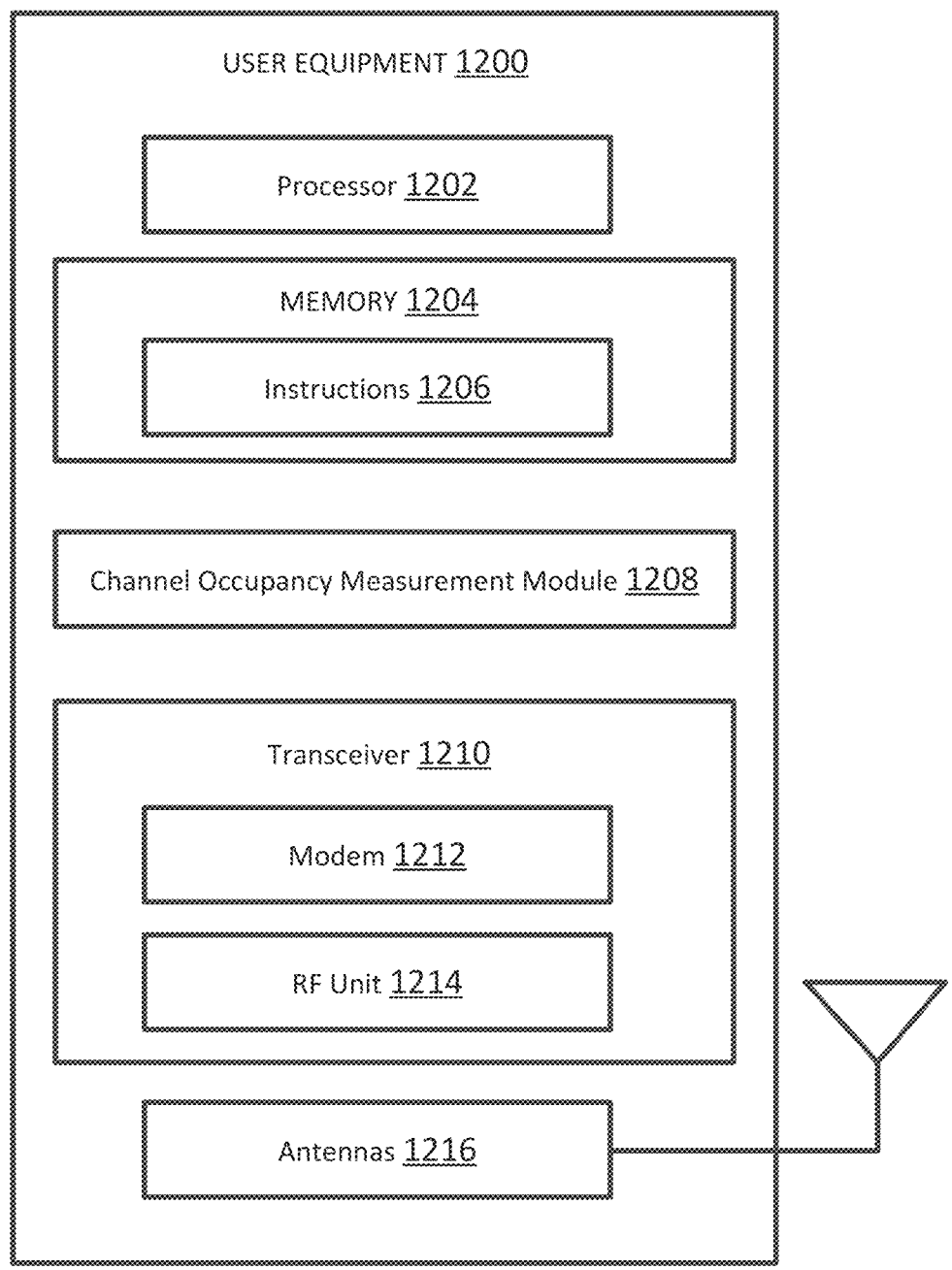
FIG. 12 is a block diagram of an exemplary user equipment (UE) according to one or more aspects of the present disclosure.

FIG. 12 is a block diagram of an exemplary UE 1200 according to one or more aspects of the present disclosure. The UE 1200 may be a UE 115, 215, UE 902, UE 1002 as discussed above in FIGS. 1-10. As shown, the UE 1200 may include a processor 1202, a memory 1204, a channel occupancy measurement module 1208, a transceiver 1210 including a modem subsystem 1212 and a RF unit 1214, and one or more antennas 1216. These elements may be in direct or indirect communication with each other, for example via one or more buses.

The processor 1202 may include a CPU, a DSC, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In an aspect, the memory 1204 includes a non-transitory computer-readable medium. The memory 1204 may store instructions 1206. The instructions 1206 may include instructions that, when executed by the processor 1202, cause the processor 1202 to perform operations described herein with reference to the UEs 115 and 215 in connection with aspects of the present disclosure, for example, aspects of FIGS. 3-10. Instructions 1206 may also be referred to as code, which may be interpreted broadly to include any type of computer-readable statement(s) as discussed above with respect to FIG. 11.

The channel occupancy measurement module 1208 may be implemented via hardware, software, or combinations thereof. For example, the channel occupancy measurement module 1208 may be implemented as a processor, circuit, and/or instructions 1206 stored in the memory 1204 and executed by the processor 1202. In some examples, the channel occupancy measurement module 1208 can be integrated within the modem subsystem 1212. For example, the channel occupancy measurement module 1208 can be implemented by a combination of software components (e.g., executed by a DSP or a general processor) and hardware components (e.g., logic gates and circuitry) within the modem subsystem 1212.

The channel occupancy measurement module 1208 may be used for various aspects of the present disclosure. The channel occupancy measurement module 1208 can be used to configure a UE to perform channel occupancy measurements of differing types and under differing conditions, and receive reports from the UE as described herein, such as aspects of FIGS. 3-10. In some aspects, the channel occupancy measurement module 1208 is configured to receive a Listen-before-Talk (LBT) failure detection configuration associated with at least one of a dormant mode or a discontinuous reception (DRX) cycle in a first cell. In some aspects, the first cell is a Scell in an unlicensed band. The configuration may include which type of measurements to perform, when they are to be performed, and what results should be reported back. The LBT failure detection can be based on UL and/or DL LBT measurements as in the schemes 400, 500, and 600 discussed above in relation to FIGS. 4, 5, and 6, respectively. The channel occupancy measurement module 1208 is also configured to perform, based on the LBT failure detection configuration, an LBT failure detection in the first cell while operating in the dormant mode for the first cell or during an inactive DRX configured-on duration of the DRX cycle. In some aspects, the LBT failure detection measurement is performed in response to a virtual UL transmission. In some aspects, the LBT failure detection measurement is performed by listening for a preconfigured DL signal. In some aspects, the channel occupancy measurement module 1208 is configured to transmit an LBT failure detection report based on the LBT failure detection. In an example, the report indicates a failure of the LBT measurement, indicating that the channel is not open for communication.

In some aspects, the channel occupancy measurement module 1208 may also be configured to perform periodic RSSI/CO measurements at intervals triggered by RSSI/CO measurement occasions and/or aperiodic RSS/CO measurement in a cell while the UE 1200 is in a dormant mode in the cell or during an inactive DRX configure on-duration and transmit reports to BS of RSSI/CO measurements through an active or non-dormant cell as in the schemes 600, 700, and 800 discussed above in relation to FIGS. 6, 7, and 8, respectively.

As shown, the transceiver 1210 may include the modem subsystem 1212 and the RF unit 1214. The transceiver 1210 can be configured to communicate bi-directionally with other devices, such as the BSs 105 and/or another core network element. The modem subsystem 1212 may be configured to modulate and/or encode the data from the memory 1204, and/or channel occupancy measurement module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., UL LBT failure detection indication, DL LBT failure detection indication, RSSI/CO report) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices and provide the received data messages for processing and/or demodulation at the transceiver 1210. The transceiver 1210 may provide the demodulated and decoded data (e.g., RRC configurations, channel occupancy measurement configuration, an LBT failure detection configuration, dormant mode configuration, DRX mode configuration, SSBs, reference signals, DMRSs) to the channel occupancy measurement module 1208 for processing. The antennas 1216 may include multiple antennas of similar or different designs in order to sustain multiple transmission links.

In some aspects, the transceiver 1210 is configured to communicate with components of the UE 1200 to receive a Listen-before-Talk (LBT) failure detection configuration associated with at least one of a dormant mode or a discontinuous reception (DRX) cycle in a first cell. The processor 1202 is configured to communicate with components of the UE 1200 to perform, based on the LBT failure detection configuration, an LBT failure detection in the first cell while operating in the dormant mode for the first cell or during an inactive DRX configured-on duration of the DRX cycle. The transceiver 1210 is further configured to communicate with components of the UE 1200 to transmit an LBT failure detection report based on the LBT failure detection.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
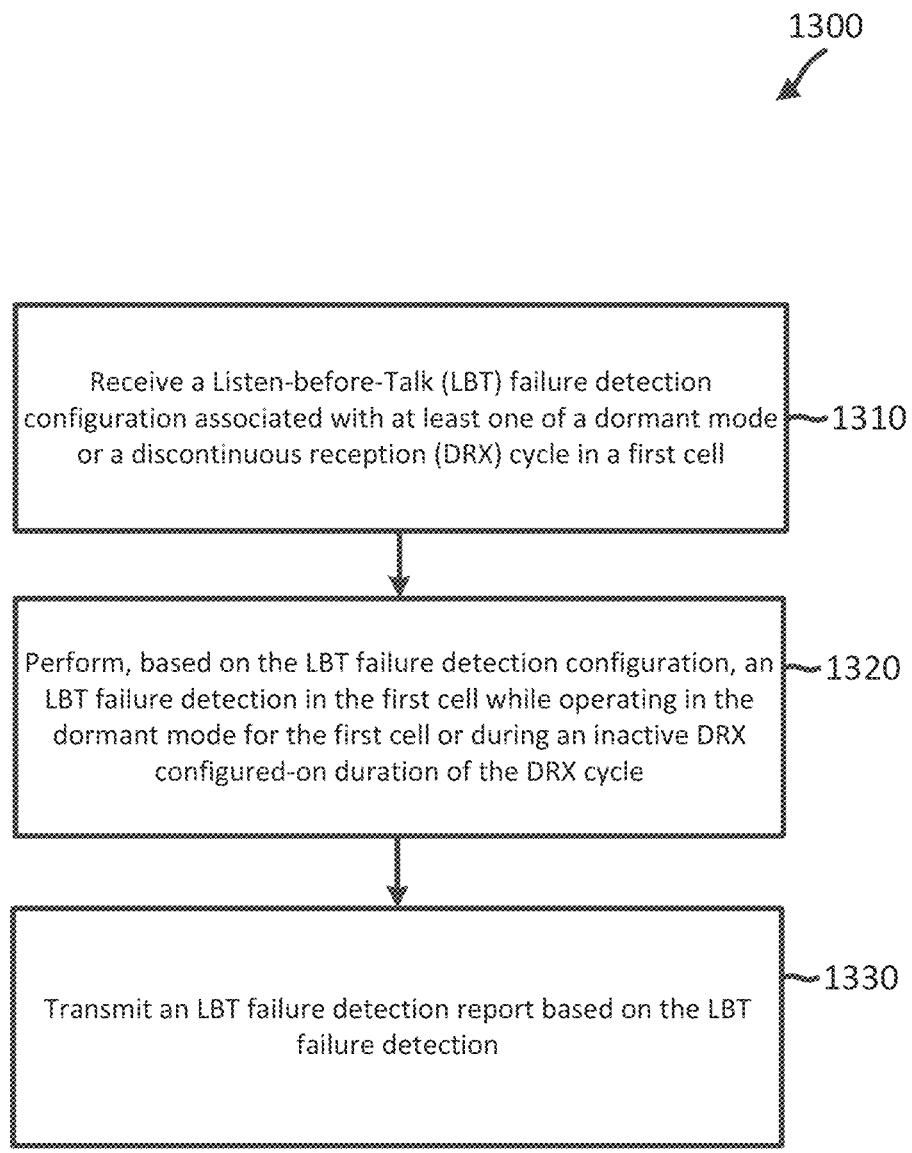
FIG. 13 is a flow diagram of a wireless communication method according to one or more aspects of the present disclosure.

FIG. 13 illustrates a flow diagram of a wireless communication method 1300 according to some aspects of the present disclosure. Steps of the method 1300 can be executed by a computing device (e.g., a processor, processing circuit, and/or other suitable component) of a wireless communication device or other suitable means for performing the step. For example, a wireless communication device, such as the UE 115, UE 215, 902, 1002, or UE 1200, may utilize one or more components, such as the processor 1202, the memory 1204, the channel occupancy measurement module 1208, the transceiver 1210, the modem subsystem 1212, the RF unit 1214, and the one or more antennas 1216, to execute the steps of method 1300. The method 1300 may employ similar mechanisms as in the schemes 300, 400, 500, 600, 700, 800, 900, and 1000 described above with respect to FIGS. 3-10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE (e.g., UE 115, UE 215, 902, 1002, or UE 1200) receives a Listen-before-Talk (LBT) failure detection configuration associated with at least one of a dormant mode or a discontinuous reception (DRX) cycle in a first cell. In some instances, the UE may utilize one or more components, such as the processor 1202, the memory 1204, the channel occupancy measurement module 1208, the transceiver 1210, the modem subsystem 1212, the RF unit 1214, and the one or more antennas 1216, to receive the LBT failure detection configuration.

In some aspects, the first cell is a Scell in an unlicensed band. The configuration may include which type of measurements to perform, when they are to be performed, and what results should be reported back. The LBT failure detection can be based on UL and/or DL LBT measurements. For instance, the LBT failure detection configuration may include an indicator indicating whether the UE is to perform the LBT failure detection while operating in the dormant mode or during the inactive DRX configured-on duration or not. In some aspects, the LBT failure detection may include at least one of a set of uplink LBT failure detection occasions (e.g., virtual UL allocations) as discussed above in relation to FIG. 4 or a set of downlink LBT failure detection occasions (e.g., preconfigured DL allocations) as discussed above in relation to FIG. 5.

At block 1320, the UE performs, based on the LBT failure detection configuration, an LBT failure detection in the first cell while operating in the dormant mode for the first cell or during an inactive DRX configured-on duration of the DRX cycle. In some instances, the UE may utilize one or more components, such as the processor 1202, the memory 1204, the channel occupancy measurement module 1208, the transceiver 1210, the modem subsystem 1212, the RF unit 1214, and the one or more antennas 1216, to perform the LBT failure detection.

In some aspects, the UE may perform an uplink LBT failure detection during an occasion of the set of uplink LBT failure detection occasions while operating in the dormant mode for the first cell by performing an LBT as discussed above in relation to FIGS. 4 and 9. In some aspects, the UE may perform an a downlink LBT failure detection during an occasion of the set of downlink LBT failure detection occasions while operating in the dormant mode for the first cell by monitoring for at least one of an SSB or a reference signal as discussed above in relation to measurement listening for a preconfigured DL signal as discussed above in relation to FIGS. 5 and 9. In some aspects, the UE may perform an uplink LBT failure detection during an occasion of the set of uplink LBT failure detection occasions within the inactive configured-on duration by performing an LBT as discussed above in relation to FIGS. 8 and 10. In some aspects, the UE may perform an a downlink LBT failure detection during an occasion of the set of downlink LBT failure detection occasions within the inactive configured-on duration by monitoring for at least one of an SSB or a reference signal as discussed above in relation to FIGS. 8 and 10.

At block 1330, the UE transmits an LBT failure detection report based on the LBT failure detection. In some instances, the UE may utilize one or more components, such as the processor 1202, the memory 1204, the channel occupancy measurement module 1208, the transceiver 1210, the modem subsystem 1212, the RF unit 1214, and the one or more antennas 1216, to transmit the LBT failure detection report.

In some aspects, the UE may transmit the LBT failure detection report based on the LBT performing during the occasion of the set of uplink LBT failure detection occasions. In some aspects, the UE may transmit the LBT failure detection report based on the preconfigured DL signal monitoring during the occasion of the set of downlink LBT failure detection occasions. In some aspects, the UE may transmit the LBT failure detection report based on the LBT performing during the occasion of the set of uplink LBT failure detection occasions and the preconfigured DL signal monitoring during the occasion of the set of downlink LBT failure detection occasions.

In some aspects, the UE may perform at least one of the RSSI measurement or the channel occupancy measurement in the first cell while operating in the dormant mode for the first cell and report the at least one of the RSSI measurement or the channel occupancy measurement to the BS as discussed above in relation to FIGS. 6, 7, and 10. In some aspects, the UE may perform at least one of the RSSI measurement or the channel occupancy measurement in the first cell during the inactive DRX configured-on duration and report the at least one of the RSSI measurement or the channel occupancy measurement to the BS as discussed above in relation to FIGS. 8 and 10.

In some aspects, the report indicates a failure of the LBT measurement, indicating that the channel may be congested and thus the likelihood of being available for communication may be low.

Figure 14:
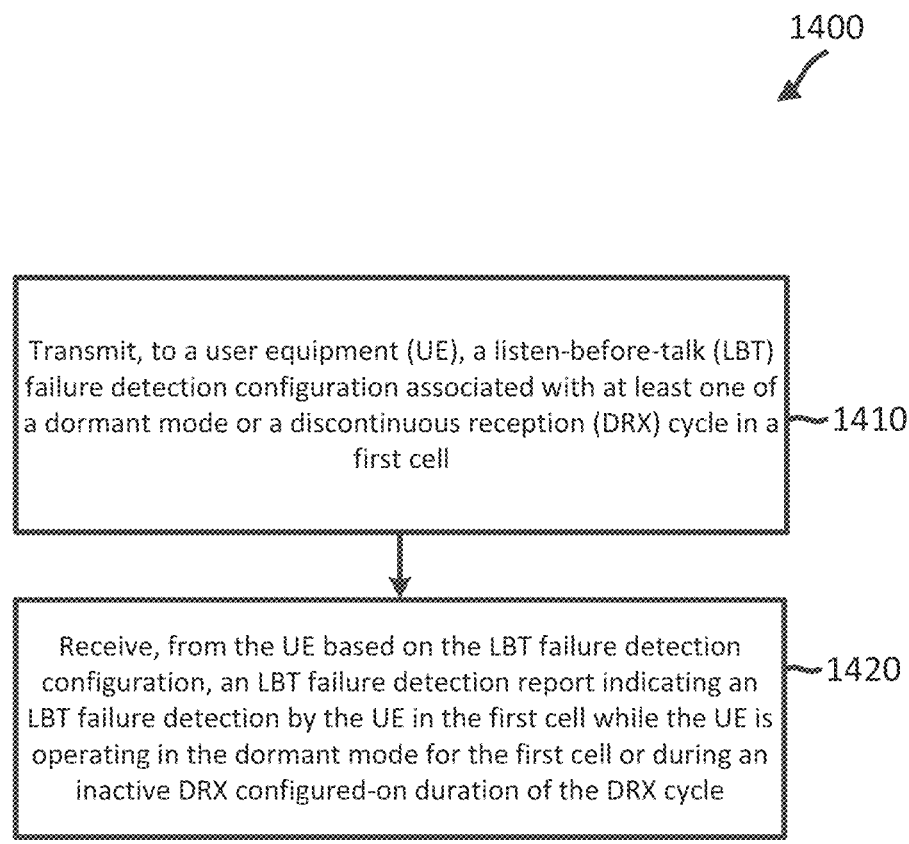
FIG. 14 is a flow diagram of a wireless communication method according to one or more aspects of the present disclosure.

FIG. 14 illustrates a flow diagram of a wireless communication method 1400 according to some aspects of the present disclosure. Steps of the method 1400 can be executed by a computing device (e.g., a processor, processing circuit, and/or other suitable component) of a wireless communication device or other suitable means for performing the step. For example, a wireless communication device, such as the BSs 105, 205, 904, 1004, and 1100 may utilize one or more components, such as the processor 1102, the memory 1104, the channel occupancy measurement module 1108, the transceiver 1110, the modem subsystem 1112, the RF unit 1114, and the one or more antennas 1116, to execute the steps of method 1400. The method 1400 may employ similar mechanisms as in the schemes 300, 400, 500, 600, 700, 800, 900, and 1000 described above with respect to FIGS. 3-10. As illustrated, the method 1400 includes a number of enumerated steps, but aspects of the method 1300 may include additional steps before, after, and in between the enumerated steps. In some aspects, one or more of the enumerated steps may be omitted or performed in a different order.

At block 1410, a BS (e.g., BSs 105, 205, 904, 1004, and 1100) transmits, to a UE (e.g., UE 115, UE 215, 902, 1002, or UE 1200), an LBT failure detection configuration associated with at least one of a dormant mode or a DRX cycle in a first cell. In an example, the first cell is a Scell in an unlicensed band. In some instances, the BS may utilize one or more components, such as the processor 1102, the memory 1104, the channel occupancy measurement module 1108, the transceiver 1110, the modem subsystem 1112, the RF unit 1114, and the one or more antennas 1116, to transmit the LBT failure detection configuration.

In some aspects, the first cell is a Scell in an unlicensed band. The configuration may include which type of measurements to perform, when they are to be performed, and what results should be reported back. The LBT failure detection can be based on UL and/or DL LBT measurements. For instance, the LBT failure detection configuration may include an indicator indicating whether the UE is to perform the LBT failure detection while operating in the dormant mode or during the inactive DRX configured-on duration or not. In some aspects, the LBT failure detection may include at least one of a set of uplink LBT failure detection occasions (e.g., virtual UL allocations) as discussed above in relation to FIG. 4 or a set of downlink LBT failure detection occasions (e.g., preconfigured DL allocations) as discussed above in relation to FIG. 5.

At block 1420, the BS receives, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle. In some instances, the BS may utilize one or more components, such as the processor 1102, the memory 1104, the channel occupancy measurement module 1108, the transceiver 1110, the modem subsystem 1112, the RF unit 1114, and the one or more antennas 1116, to receive the LBT failure detection report.

In some aspects, the BS may receive the LBT failure detection report based on an LBT performed by the UE during the occasion of the set of uplink LBT failure detection occasions. In some aspects, the BS may receive the LBT failure detection report based on preconfigured DL signal monitoring by the UE during the occasion of the set of downlink LBT failure detection occasions. In some aspects, the BS may receive the LBT failure detection report based on an LBT performed by the UE during the occasion of the set of uplink LBT failure detection occasions and preconfigured DL signal monitoring by the UE during the occasion of the set of downlink LBT failure detection occasions.

In some aspects, the BS may also receive, from the UE, a measurement report including at least one of a receive signal strength indicator (RSSI) measurement or a channel occupancy measurement for the first cell measured while the UE is operating in the dormant mode for the first cell or during the inactive DRX configured-on duration as discussed above in relation to FIGS. 6, 7, 8, and 10.

Further embodiments of the present disclosure include a method of wireless communication performed by a user equipment (UE). The method of wireless communication includes receiving a listen-before-talk (LBT) failure detection configuration associated with at least one of a dormant mode or a discontinuous reception (DRX) cycle in a first cell of a wireless communication network. The method of wireless communication also includes performing, based on the LBT failure detection configuration, an LBT failure detection in the first cell while operating in the dormant mode for the first cell or during an inactive DRX configured-on duration of the DRX cycle. The method of wireless communication also includes transmitting an LBT failure detection report based on the LBT failure detection.

The method may also include one or more of the following features. For instance, the method includes where the receiving the LBT failure detection configuration includes receiving the LBT failure detection configuration including an indicator indicating whether the UE is to perform the LBT failure detection while operating in the dormant mode or during the inactive DRX configured-on duration or not. The receiving the LBT failure detection configuration includes receiving the LBT failure detection configuration indicating at least one of a set of uplink LBT failure detection occasions or a set of downlink LBT failure detection occasions. The performing the LBT failure detection includes performing, while operating in the dormant mode for the first cell, at least one of an uplink LBT failure detection during an occasion of the set of uplink LBT failure detection occasions; or a downlink LBT failure detection during an occasion of the set of downlink LBT failure detection occasions. The first cell is a secondary cell of the wireless communication network. The transmitting the LBT failure detection report includes transmitting, to the network via a second cell of the network, the LBT failure detection report, the second cell being different from the first cell. The performing the LBT failure detection includes performing at least one of an uplink LBT failure detection during an occasion of the set of uplink LBT failure detection occasions within the inactive DRX configured-on duration; or a downlink LBT failure detection during an occasion of the set of downlink LBT failure detection occasions within the inactive DRX configured-on duration. The method may include monitoring for a wakeup signal (WUS) for a first configured-on duration of the DRX cycle; and determining that there is no WUS detected for the first configured-on duration, the first configured-on duration corresponding to the inactive DRX configured-on duration based on the determining. The receiving the LBT failure detection configuration includes receiving the LBT failure detection configuration indicating the set of uplink LBT failure detection occasions, where an occasion of the set of uplink failure detection occasions is associated with a virtual uplink allocation. The method may include refraining from performing an uplink transmission based on the virtual uplink allocation. The performing the LBT failure detection includes performing, based on the virtual uplink allocation, an LBT during the occasion of the set of uplink failure detection occasions. The transmitting the LBT failure detection report includes transmitting the LBT failure detection report based on the LBT associated with the virtual uplink allocation. The receiving the LBT failure detection configuration further includes receiving a first configuration indicating the set of uplink LBT failure detection occasions; and receiving a second configuration indicating the set of downlink LBT failure detection occasions. The receiving the LBT failure detection configuration further includes receiving the LBT failure detection configuration indicating the set of uplink LBT failure detection occasions and the set of downlink LBT failure detection occasions. The transmitting the LBT failure detection report includes transmitting the LBT failure detection report based on the LBT associated with the virtual uplink allocation and the monitoring associated with the preconfigured downlink allocation. The receiving the LBT failure detection configuration further includes receiving the LBT failure detection configuration indicating the set of downlink LBT failure detection occasions, where an occasion of the set of downlink failure detection occasions is associated with a preconfigured downlink allocation. The preconfigured downlink allocation is associated with at least one of a synchronization signal block (SSB) or a reference signal. The performing the LBT failure detection includes monitoring, during the occasion of the set of downlink failure detection occasions, for a downlink preconfigured signal based on the preconfigured downlink allocation. The transmitting the LBT failure detection report includes transmitting the LBT failure detection report based on the monitoring. The receiving the LBT failure detection configuration further includes receiving a configuration including a signal measurement configuration and the LBT failure detection configuration, the signal measurement configuration associated with at least one of a beam measurement or a channel state information (CSI) measurement. The method may include determining at least one of a receive signal strength indicator (RSSI) measurement or a channel occupancy measurement in the first cell while operating in the dormant mode for the first cell or during the inactive DRX configured-on duration; and transmitting a measurement report including the at least one of the RSSI measurement or the channel occupancy measurement. The determining the at least one of the RSSI measurement or the channel occupancy measurement includes determining, while operating in the dormant mode for the first cell, the at least one of the RSSI measurement or the channel occupancy measurement in the first cell; and the transmitting the measurement report includes transmitting, to the network via a second cell of the wireless communication network, the measurement report, the second cell being different from the first cell. The method may include receiving a request for the measurement report; and receiving, in response to the measurement report, an instruction to switch from the dormant mode to a non-dormant mode for the first cell. The receiving the LBT failure detection configuration includes receiving the LBT failure detection configuration including a periodic measurement configuration associated with the at least one of the RSSI measurement or the channel occupancy measurement.

Further embodiments of the present disclosure include a method of wireless communication performed by a base station (BS). The method of wireless communication includes transmitting, to a user equipment (UE), a listen-before-talk (LBT) failure detection configuration associated with at least one of a dormant mode or a discontinuous reception (DRX) cycle in a first cell of a wireless communication network; and receiving, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

The method may also include one or more of the following features. For instance, the method includes where the transmitting the LBT failure detection configuration includes transmitting the LBT failure detection configuration including an indicator indicating whether the UE is to perform the LBT failure detection while operating in the dormant mode or during the inactive DRX configured-on duration or not. The transmitting the LBT failure detection configuration includes transmitting the LBT failure detection configuration indicating at least one of a set of uplink LBT failure detection occasions or a set of downlink LBT failure detection occasions. The LBT failure detection is associated with at least one of an occasion of the set of uplink LBT failure detection occasions or an occasion of the set of downlink LBT failure detection occasions. The first cell is a secondary cell for the network. The receiving the LBT failure detection report includes receiving, from the UE via a second cell of the wireless communication network, the LBT failure detection report, the second cell being different from the first cell. The at least one of the occasion of the set of uplink LBT failure detection occasions or the occasion of the set of downlink LBT failure detection occasions is within the inactive DRX configured-on duration. The transmitting the LBT failure detection configuration includes transmitting the LBT failure detection configuration indicating the set of uplink LBT failure detection occasions, where the occasion of the set of uplink LBT failure detection occasions is associated with a virtual uplink allocation. The receiving the LBT failure detection report includes receiving the LBT failure detection report based on the virtual uplink allocation. The transmitting the LBT failure detection configuration further includes transmitting a first configuration indicating the set of uplink LBT failure detection occasions; and transmitting a second configuration indicating the set of downlink LBT failure detection occasions. The transmitting the LBT failure detection configuration further includes transmitting the LBT failure detection configuration indicating the set of uplink LBT failure detection occasions and the set of downlink LBT failure detection occasions. The receiving the LBT failure detection report includes receiving the LBT failure detection report based on the virtual uplink allocation and the preconfigured downlink allocation. The transmitting the LBT failure detection configuration further includes transmitting the LBT failure detection configuration indicating the set of downlink LBT failure detection occasions, where the occasion of the set of downlink LBT failure detection occasions is associated with a preconfigured downlink allocation. The preconfigured downlink allocation is associated with at least one of a synchronization signal block (SSB) or a reference signal. The receiving the LBT failure detection report includes receiving the LBT failure detection report based on the preconfigured downlink allocation. The transmitting the LBT failure detection configuration includes transmitting a configuration including a signal measurement configuration and the LBT failure detection configuration, the signal measurement configuration associated with at least one of a beam measurement or a channel state information (CSI) measurement. The method may include receiving, from the UE, a measurement report including at least one of a receive signal strength indicator (RSSI) measurement or a channel occupancy measurement for the first cell measured while the UE is operating in the dormant mode for the first cell or during the inactive DRX configured-on duration. The receiving the measurement report includes receiving, from the UE via a second cell of the wireless communication network, the measurement report including the at least one of the RSSI measurement or the channel occupancy measurement for the first cell, the second cell being different from the first cell. The method may include transmitting, to the UE, a request for the measurement report; and transmitting, to the UE based on the measurement report, an instruction to switch from the dormant mode to a non-dormant mode in the first cell. The transmitting the LBT failure detection configuration includes transmitting, to the UE, the LBT failure detection configuration including a periodic measurement configuration associated with the at least one of the RSSI measurement or the channel occupancy measurement.

Further embodiments of the present disclosure include a user equipment (UE). The user equipment includes a transceiver configured to receive a listen-before-talk (LBT) failure detection configuration associated with at least one of a dormant mode or a discontinuous reception (DRX) cycle in a first cell of a wireless communication network. The user equipment also includes a processor configured to perform, based on the LBT failure detection configuration, an LBT failure detection in the first cell while operating in the dormant mode for the first cell or during an inactive DRX configured-on duration of the DRX cycle. The user equipment also includes where the transceiver is further configured to transmit an LBT failure detection report based on the LBT failure detection.

The UE may also include one or more of the following features. For instance, the user equipment includes where the LBT failure detection configuration includes an indicator indicating whether the UE is to perform the LBT failure detection while operating in the dormant mode or during the inactive DRX configured-on duration or not. The LBT failure detection configuration indicates at least one of a set of uplink LBT failure detection occasions or a set of downlink LBT failure detection occasions. The processor configured to perform the LBT failure detection is further configured to perform, while operating in the dormant mode for the first cell, at least one of an uplink LBT failure detection during an occasion of the set of uplink LBT failure detection occasions; or a downlink LBT failure detection during an occasion of the set of downlink LBT failure detection occasions. The first cell is a secondary cell of the wireless communication network. The transceiver is configured to transmit the LBT failure detection report to the network via a second cell of the network, the second cell being different from the first cell. The processor configured to perform the LBT failure detection is further configured to perform at least one of an uplink LBT failure detection during an occasion of the set of uplink LBT failure detection occasions within the inactive DRX configured-on duration; or a downlink LBT failure detection during an occasion of the set of downlink LBT failure detection occasions within the inactive DRX configured-on duration. The processor is further configured to monitor for a wakeup signal (WUS) for a first configured-on duration of the DRX cycle; and the processor is further configured to determine that there is no WUS detected for the first configured-on duration, the first configured-on duration corresponding to the inactive DRX configured-on duration based on the determining. The LBT failure detection configuration indicates the set of uplink LBT failure detection occasions, where an occasion of the set of uplink failure detection occasions is associated with a virtual uplink allocation. The transceiver is further configured to refrain from performing an uplink transmission based on the virtual uplink allocation. The processor configured to perform the LBT failure detection is further configured to perform, based on the virtual uplink allocation, an LBT during the occasion of the set of uplink failure detection occasions. The LBT failure detection report is based on the LBT associated with the virtual uplink allocation. The LBT failure detection configuration indicates the set of uplink LBT failure detection occasions; and the transceiver is further configured to receive a second configuration indicating the set of downlink LBT failure detection occasions. The LBT failure detection configuration indicates the set of uplink LBT failure detection occasions and the set of downlink LBT failure detection occasions. The LBT failure detection report is based on the LBT associated with the virtual uplink allocation and the monitoring associated with the preconfigured downlink allocation. The LBT failure detection configuration indicates the set of downlink LBT failure detection occasions, where an occasion of the set of downlink failure detection occasions is associated with a preconfigured downlink allocation. The preconfigured downlink allocation is associated with at least one of a synchronization signal block (SSB) or a reference signal. The LBT failure detection further includes monitoring, during the occasion of the set of downlink failure detection occasions, for a downlink preconfigured signal based on the preconfigured downlink allocation. The LBT failure detection report is based on the monitoring. The LBT failure detection configuration further includes a signal measurement configuration and the LBT failure detection configuration, the signal measurement configuration associated with at least one of a beam measurement or a channel state information (CSI) measurement. The processor is further configured to determine at least one of a receive signal strength indicator (RSSI) measurement or a channel occupancy measurement in the first cell while operating in the dormant mode for the first cell or during the inactive DRX configured-on duration; and the transceiver is further configured to transmit a measurement report including the at least one of the RSSI measurement or the channel occupancy measurement. The measurement report is transmitted to the network via a second cell of the wireless communication network, the second cell being different from the first cell. The transceiver is further configured to receive a request for the measurement report; and the transceiver is further configured to receive, in response to the measurement report, an instruction to switch from the dormant mode to a non-dormant mode for the first cell. The LBT failure detection configuration includes a periodic measurement configuration associated with the at least one of the RSSI measurement or the channel occupancy measurement.

Further embodiments of the present disclosure include a base station (BS). The base station includes a transceiver configured to transmit, to a user equipment (UE), a listen-before-talk (LBT) failure detection configuration associated with at least one of a dormant mode or a discontinuous reception (DRX) cycle in a first cell of a wireless communication network; and where the transceiver is further configured to receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

The BS may also include one or more of the following features. For instance, the base station includes where the LBT failure detection configuration includes an indicator indicating whether the UE is to perform the LBT failure detection while operating in the dormant mode or during the inactive DRX configured-on duration or not. The LBT failure detection configuration indicates at least one of a set of uplink LBT failure detection occasions or a set of downlink LBT failure detection occasions. The LBT failure detection is associated with at least one of an occasion of the set of uplink LBT failure detection occasions or an occasion of the set of downlink LBT failure detection occasions. The first cell is a secondary cell for the network. The LBT failure detection report is received via a second cell of the wireless communication network, the second cell being different from the first cell. The at least one of the occasion of the set of uplink LBT failure detection occasions or the occasion of the set of downlink LBT failure detection occasions is within the inactive DRX configured-on duration. The LBT failure detection configuration indicates the set of uplink LBT failure detection occasions, where the occasion of the set of uplink LBT failure detection occasions is associated with a virtual uplink allocation. The LBT failure detection report is based on the virtual uplink allocation. The LBT failure detection configuration further includes a first configuration indicating the set of uplink LBT failure detection occasions; and a second configuration indicating the set of downlink LBT failure detection occasions. The LBT failure detection configuration indicates the set of uplink LBT failure detection occasions and the set of downlink LBT failure detection occasions. The LBT failure detection report is based on the virtual uplink allocation and the preconfigured downlink allocation. The LBT failure detection configuration indicates the set of downlink LBT failure detection occasions, where the occasion of the set of downlink LBT failure detection occasions is associated with a preconfigured downlink allocation. The preconfigured downlink allocation is associated with at least one of a synchronization signal block (SSB) or a reference signal. The LBT failure detection report is based on the preconfigured downlink allocation. The LBT failure detection configuration further includes a signal measurement configuration and the LBT failure detection configuration, the signal measurement configuration associated with at least one of a beam measurement or a channel state information (CSI) measurement. The transceiver is further configured to receive, from the UE, a measurement report including at least one of a receive signal strength indicator (RSSI) measurement or a channel occupancy measurement for the first cell measured while the UE is operating in the dormant mode for the first cell or during the inactive DRX configured-on duration.

Further embodiments of the present disclosure include a non-transitory computer-readable medium having program code recorded thereon. The non-transitory computer-readable medium includes code for causing a UE to receive a listen-before-talk (LBT) failure detection configuration associated with at least one of a dormant mode or a discontinuous reception (DRX) cycle in a first cell of a wireless communication network. The non-transitory computer-readable medium also includes code for causing the UE to perform, based on the LBT failure detection configuration, an LBT failure detection in the first cell while operating in the dormant mode for the first cell or during an inactive DRX configured-on duration of the DRX cycle. The non-transitory computer-readable medium also includes code for causing the UE to transmit an LBT failure detection report based on the LBT failure detection.

The non-transitory computer-readable medium may also include one or more of the following features. For instance, the non-transitory computer-readable medium includes where the LBT failure detection configuration includes an indicator indicating whether the UE is to perform the LBT failure detection while operating in the dormant mode or during the inactive DRX configured-on duration or not. The LBT failure detection configuration indicates at least one of a set of uplink LBT failure detection occasions or a set of downlink LBT failure detection occasions. The code for causing the UE to perform the LBT failure detection is further configured to perform, while operating in the dormant mode for the first cell, at least one of an uplink LBT failure detection during an occasion of the set of uplink LBT failure detection occasions; or a downlink LBT failure detection during an occasion of the set of downlink LBT failure detection occasions. The first cell is a secondary cell of the wireless communication network. The code for causing the UE to transmit an LBT failure detection report causes the report to be transmitted to the network via a second cell of the network, the second cell being different from the first cell. The code for causing the UE to perform the LBT failure detection is further configured to performing at least one of an uplink LBT failure detection during an occasion of the set of uplink LBT failure detection occasions within the inactive DRX configured-on duration; or a downlink LBT failure detection during an occasion of the set of downlink LBT failure detection occasions within the inactive DRX configured-on duration. The non-transitory computer-readable medium may include code for causing the UE to monitor for a wakeup signal (WUS) for a first configured-on duration of the DRX cycle; and code for causing the UE to determine that there is no WUS detected for the first configured-on duration, the first configured-on duration corresponding to the inactive DRX configured-on duration based on the determining. The LBT failure detection configuration indicates the set of uplink LBT failure detection occasions, where an occasion of the set of uplink failure detection occasions is associated with a virtual uplink allocation. The non-transitory computer-readable medium may include code for causing the UE to refrain from performing an uplink transmission based on the virtual uplink allocation. The code for causing the UE to perform the LBT failure detection is further configured to performing, based on the virtual uplink allocation, an LBT during the occasion of the set of uplink failure detection occasions. The LBT failure detection report is based on the LBT associated with the virtual uplink allocation. The LBT failure detection configuration indicates the set of uplink LBT failure detection occasions; and may include code for causing the UE to receive a second configuration indicating the set of downlink LBT failure detection occasions. The LBT failure detection configuration indicates the set of uplink LBT failure detection occasions and the set of downlink LBT failure detection occasions. The LBT failure detection report is based on the LBT associated with the virtual uplink allocation and the monitoring associated with the preconfigured downlink allocation. The LBT failure detection configuration indicates the set of downlink LBT failure detection occasions, where an occasion of the set of downlink failure detection occasions is associated with a preconfigured downlink allocation. The preconfigured downlink allocation is associated with at least one of a synchronization signal block (SSB) or a reference signal. The code for causing the UE to perform LBT failure detection is further configured to monitor, during the occasion of the set of downlink failure detection occasions, for a downlink preconfigured signal based on the preconfigured downlink allocation. The LBT failure detection report is based on the monitoring. The LBT failure detection configuration further includes a signal measurement configuration and the LBT failure detection configuration, the signal measurement configuration associated with at least one of a beam measurement or a channel state information (CSI) measurement. The non-transitory computer-readable medium may include code for causing the UE to determine at least one of a receive signal strength indicator (RSSI) measurement or a channel occupancy measurement in the first cell while operating in the dormant mode for the first cell or during the inactive DRX configured-on duration; and code for causing the UE to transmit a measurement report including the at least one of the RSSI measurement or the channel occupancy measurement. The measurement report is transmitted to the network via a second cell of the wireless communication network, the second cell being different from the first cell. The transceiver is further configured to receive a request for the measurement report; and the transceiver is further configured to receive, in response to the measurement report, an instruction to switch from the dormant mode to a non-dormant mode for the first cell. The LBT failure detection configuration includes a periodic measurement configuration associated with the at least one of the RSSI measurement or the channel occupancy measurement.

Further embodiments of the present disclosure include a non-transitory computer-readable medium having program code recorded thereon. The non-transitory computer-readable medium includes code for causing a base station (BS)

to transmit, to a user equipment (UE), a listen-before-talk (LBT) failure detection configuration associated with at least one of a dormant mode or a discontinuous reception (DRX) cycle in a first cell of a wireless communication network; and code for causing the BS to receive, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

The non-transitory computer-readable medium may also include one or more of the following features. For instance, the non-transitory computer-readable medium includes where the LBT failure detection configuration includes an indicator indicating whether the UE is to perform the LBT failure detection while operating in the dormant mode or during the inactive DRX configured-on duration or not. The LBT failure detection configuration indicates at least one of a set of uplink LBT failure detection occasions or a set of downlink LBT failure detection occasions. The LBT failure detection is associated with at least one of an occasion of the set of uplink LBT failure detection occasions or an occasion of the set of downlink LBT failure detection occasions. The first cell is a secondary cell for the network. The LBT failure detection report is received via a second cell of the wireless communication network, the second cell being different from the first cell. The at least one of the occasion of the set of uplink LBT failure detection occasions or the occasion of the set of downlink LBT failure detection occasions is within the inactive DRX configured-on duration. The LBT failure detection configuration indicates the set of uplink LBT failure detection occasions, where the occasion of the set of uplink LBT failure detection occasions is associated with a virtual uplink allocation. The LBT failure detection report is based on the virtual uplink allocation. The LBT failure detection configuration further includes a first configuration indicating the set of uplink LBT failure detection occasions; and a second configuration indicating the set of downlink LBT failure detection occasions. The LBT failure detection configuration indicates the set of uplink LBT failure detection occasions and the set of downlink LBT failure detection occasions. The LBT failure detection report is based on the virtual uplink allocation and the preconfigured downlink allocation. The LBT failure detection configuration indicates the set of downlink LBT failure detection occasions, where the occasion of the set of downlink LBT failure detection occasions is associated with a preconfigured downlink allocation. The preconfigured downlink allocation is associated with at least one of a synchronization signal block (SSB) or a reference signal. The LBT failure detection report is based on the preconfigured downlink allocation. The LBT failure detection configuration further includes a signal measurement configuration and the LBT failure detection configuration, the signal measurement configuration associated with at least one of a beam measurement or a channel state information (CSI) measurement. The non-transitory computer-readable medium may include code for causing the BS to receive, from the UE, a measurement report including at least one of a receive signal strength indicator (RSSI) measurement or a channel occupancy measurement for the first cell measured while the UE is operating in the dormant mode for the first cell or during the inactive DRX configured-on duration. The measurement report is received from the UE via a second cell of the wireless communication network, the measurement report including the at least one of the RSSI measurement or the channel occupancy measurement for the first cell, the second cell being different from the first cell. The non-transitory computer-readable medium may include code for causing the BS to transmit, to the UE, a request for the measurement report; and code for causing the BS to transmit, to the UE based on the measurement report, an instruction to switch from the dormant mode to a non-dormant mode in the first cell. The LBT failure detection configuration includes a periodic measurement configuration associated with the at least one of the RSSI measurement or the channel occupancy measurement.

Further embodiments of the present disclosure include a user equipment (UE). The user equipment includes means for receiving a listen-before-talk (LBT) failure detection configuration associated with at least one of a dormant mode or a discontinuous reception (DRX) cycle in a first cell of a wireless communication network. The user equipment also includes means for performing, based on the LBT failure detection configuration, an LBT failure detection in the first cell while operating in the dormant mode for the first cell or during an inactive DRX configured-on duration of the DRX cycle. The user equipment also includes means for transmitting an LBT failure detection report based on the LBT failure detection.

The UE may also include one or more of the following features. For instance, the UE includes where the means for receiving the LBT failure detection configuration is further configured to receive the LBT failure detection configuration including an indicator indicating whether the UE is to perform the LBT failure detection while operating in the dormant mode or during the inactive DRX configured-on duration or not. The means for receiving the LBT failure detection configuration is further configured to receive the LBT failure detection configuration indicating at least one of a set of uplink LBT failure detection occasions or a set of downlink LBT failure detection occasions. The means for performing the LBT failure detection is further configured to perform, while operating in the dormant mode for the first cell, at least one of an uplink LBT failure detection during an occasion of the set of uplink LBT failure detection occasions; or a downlink LBT failure detection during an occasion of the set of downlink LBT failure detection occasions. The first cell is a secondary cell of the wireless communication network. The means for transmitting the LBT failure detection report is further configured to transmit, to the network via a second cell of the network, the LBT failure detection report, the second cell being different from the first cell. The means for performing the LBT failure detection is further configured to perform at least one of an uplink LBT failure detection during an occasion of the set of uplink LBT failure detection occasions within the inactive DRX configured-on duration; or a downlink LBT failure detection during an occasion of the set of downlink LBT failure detection occasions within the inactive DRX configured-on duration. The UE may include means for monitoring for a wakeup signal (WUS) for a first configured-on duration of the DRX cycle; and means for determining that there is no WUS detected for the first configured-on duration, the first configured-on duration corresponding to the inactive DRX configured-on duration based on the determining. The means for receiving the LBT failure detection configuration is further configured to receive the LBT failure detection configuration indicating the set of uplink LBT failure detection occasions, where an occasion of the set of uplink failure detection occasions is associated with a virtual uplink allocation. The UE may include means for refraining from performing an uplink transmission based on the virtual uplink allocation. The means for performing the LBT failure detection is further configured to perform, based on the virtual uplink allocation, an LBT during the occasion of the set of uplink failure detection occasions. The means for transmitting the LBT failure detection report is further configured to transmit the LBT failure detection report based on the LBT associated with the virtual uplink allocation. The means for receiving the LBT failure detection configuration is further configured to receive a first configuration indicating the set of uplink LBT failure detection occasions; and receive a second configuration indicating the set of downlink LBT failure detection occasions. The means for receiving the LBT failure detection configuration is further configured to receive the LBT failure detection configuration indicating the set of uplink LBT failure detection occasions and the set of downlink LBT failure detection occasions. The means for transmitting the LBT failure detection report is further configured to transmit the LBT failure detection report based on the LBT associated with the virtual uplink allocation and the monitoring associated with the preconfigured downlink allocation. The means for receiving the LBT failure detection configuration is further configured to receive the LBT failure detection configuration indicating the set of downlink LBT failure detection occasions, where an occasion of the set of downlink failure detection occasions is associated with a preconfigured downlink allocation. The preconfigured downlink allocation is associated with at least one of a synchronization signal block (SSB) or a reference signal. The means for performing the LBT failure detection is further configured to monitor, during the occasion of the set of downlink failure detection occasions, for a downlink preconfigured signal based on the preconfigured downlink allocation. The means for transmitting the LBT failure detection report is further configured to transmit the LBT failure detection report based on the monitoring. The means for receiving the LBT failure detection configuration is further configured to receive a configuration including a signal measurement configuration and the LBT failure detection configuration, the signal measurement configuration associated with at least one of a beam measurement or a channel state information (CSI) measurement. The UE may include means for determining at least one of a receive signal strength indicator (RSSI) measurement or a channel occupancy measurement in the first cell while operating in the dormant mode for the first cell or during the inactive DRX configured-on duration; and means for transmitting a measurement report including the at least one of the RSSI measurement or the channel occupancy measurement. The means for determining the at least one of the RSSI measurement or the channel occupancy measurement is further configured to determine, while operating in the dormant mode for the first cell, the at least one of the RSSI measurement or the channel occupancy measurement in the first cell; and the means for transmitting the measurement report is further configured to transmit, to the network via a second cell of the wireless communication network, the measurement report, the second cell being different from the first cell. The UE may include means for receiving a request for the measurement report; and means for receiving, in response to the measurement report, an instruction to switch from the dormant mode to a non-dormant mode for the first cell. The means for receiving the LBT failure detection configuration is further configured to receive the LBT failure detection configuration including a periodic measurement configuration associated with the at least one of the RSSI measurement or the channel occupancy measurement.

Further embodiments of the present disclosure include a base station (BS). The base station includes means for transmitting, to a user equipment (UE), a listen-before-talk (LBT) failure detection configuration associated with at least one of a dormant mode or a discontinuous reception (DRX) cycle in a first cell of a wireless communication network; and means for receiving, from the UE based on the LBT failure detection configuration, an LBT failure detection report indicating an LBT failure detection by the UE in the first cell while the UE is operating in the dormant mode for the first cell or during an inactive DRX configured-on duration of the DRX cycle.

The BS may also include one or more of the following features. For instance, the BS includes where the means for transmitting the LBT failure detection configuration is further configured to transmit the LBT failure detection configuration including an indicator indicating whether the UE is to perform the LBT failure detection while operating in the dormant mode or during the inactive DRX configured-on duration or not. The means for transmitting the LBT failure detection configuration is further configured to transmit the LBT failure detection configuration indicating at least one of a set of uplink LBT failure detection occasions or a set of downlink LBT failure detection occasions. The LBT failure detection is associated with at least one of an occasion of the set of uplink LBT failure detection occasions or an occasion of the set of downlink LBT failure detection occasions. The first cell is a secondary cell for the network. The means for receiving the LBT failure detection report is further configured to receive, from the UE via a second cell of the wireless communication network, the LBT failure detection report, the second cell being different from the first cell. The at least one of the occasion of the set of uplink LBT failure detection occasions or the occasion of the set of downlink LBT failure detection occasions is within the inactive DRX configured-on duration. The means for transmitting the LBT failure detection configuration is further configured to transmit the LBT failure detection configuration indicating the set of uplink LBT failure detection occasions, where the occasion of the set of uplink LBT failure detection occasions is associated with a virtual uplink allocation. The means for transmitting the LBT failure detection configuration is further configured to transmit the LBT failure detection configuration indicating the set of downlink LBT failure detection occasions, where the occasion of the set of downlink LBT failure detection occasions is associated with a preconfigured downlink allocation. The means for transmitting the LBT failure detection configuration is further configured to transmit a configuration including a signal measurement configuration and the LBT failure detection configuration, the signal measurement configuration associated with at least one of a beam measurement or a channel state information (CSI) measurement. The BS may include means for receiving, from the UE, a measurement report including at least one of a receive signal strength indicator (RSSI) measurement or a channel occupancy measurement for the first cell measured while the UE is operating in the dormant mode for the first cell or during the inactive DRX configured-on duration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   receiving a listen-before-talk (LBT) failure detection configuration associated with at least one of a dormant mode or a discontinuous reception (DRX) cycle in a first cell of a wireless communication network, wherein when in the dormant mode the UE performs one or more actions in a secondary cell (SCell) without monitoring a physical downlink control channel (PDCCH) in the SCell, wherein the LBT failure detection configuration indicates at least one of a set of uplink LBT failure detection occasions, and wherein an occasion of the set of uplink failure detection occasions is associated with a virtual uplink allocation;
   performing, based on the LBT failure detection configuration, an LBT failure detection in the first cell while operating in the dormant mode for the first cell or during an inactive DRX configured-on duration of the DRX cycle wherein performing the LBT failure detection comprises performing, based on the virtual uplink allocation, an LBT during the occasion of the set of uplink failure detection occasions;
   refraining from performing an uplink transmission based on the virtual uplink allocation; and
   transmitting an LBT failure detection report based on the LBT failure detection.

2. The method of claim 1, wherein the receiving the LBT failure detection configuration comprises:
   receiving the LBT failure detection configuration including an indicator indicating whether the UE is to perform the LBT failure detection while operating in the dormant mode or during the inactive DRX configured-on duration or not.

3. The method of claim 1, wherein:
   the performing the LBT failure detection comprises:
      performing
   an uplink LBT failure detection during an occasion of the set of uplink LBT failure detection occasions within the inactive DRX configured-on duration; and
   the method further comprises:
      monitoring for a wakeup signal (WUS) for a first configured-on duration of the DRX cycle; and
      determining that there is no WUS detected for the first configured-on duration, the first configured-on duration corresponding to the inactive DRX configured-on duration based on the determining.

4. The method of claim 1, wherein
   the LBT failure detection configuration further indicates a set of downlink LBT failure detection occasions, wherein an occasion of the set of downlink failure detection occasions is associated with a preconfigured downlink allocation;
   the performing the LBT failure detection further comprises:
      monitoring, during the occasion of the set of downlink failure detection occasions, for a downlink preconfigured signal based on the preconfigured downlink allocation; and
   the transmitting the LBT failure detection report further comprises:
      transmitting the LBT failure detection report based on the monitoring.

5. The method of claim 1, wherein the receiving the LBT failure detection configuration further comprises:
   receiving a configuration comprising a signal measurement configuration and the LBT failure detection configuration, the signal measurement configuration associated with at least one of a beam measurement or a channel state information (CSI) measurement.

6. The method of claim 1, further comprising:
   determining at least one of a receive signal strength indicator (RSSI) measurement or a channel occupancy measurement in the first cell while operating in the dormant mode for the first cell or during the inactive DRX configured-on duration; and
   transmitting a measurement report including the at least one of the RSSI measurement or the channel occupancy measurement.

7. The method of claim 6, wherein:
   the determining the at least one of the RSSI measurement or the channel occupancy measurement comprises:
      determining, while operating in the dormant mode for the first cell, the at least one of the RSSI measurement or the channel occupancy measurement in the first cell; and
   the method further comprises:
      receiving a request for the measurement report; and
      receiving, in response to the measurement report, an instruction to switch from the dormant mode to a non-dormant mode for the first cell.

8. The method of claim 6, wherein the receiving the LBT failure detection configuration comprises:
receiving the LBT failure detection configuration including a periodic measurement configuration associated with the at least one of the RSSI measurement or the channel occupancy measurement.

9. A method of wireless communication performed by a user equipment (UE), comprising:
receiving a listen-before-talk (LBT) failure detection configuration associated with at least one of a dormant mode or a discontinuous reception (DRX) cycle in a first cell of a wireless communication network, wherein when in the dormant mode the UE performs one or more actions in a secondary cell (SCell) without monitoring a physical downlink control channel (PDCCH) in the SCell, wherein the receiving the LBT failure detection configuration further comprises:
receiving a first configuration indicating the set of uplink LBT failure detection occasions, and
receiving a second configuration indicating a set of downlink LBT failure detection occasions;
performing, based on the LBT failure detection configuration, an LBT failure detection in the first cell while operating in the dormant mode for the first cell or during an inactive DRX configured-on duration of the DRX cycle; and
transmitting an LBT failure detection report based on the LBT failure detection.

10. A method of wireless communication performed by a user equipment (UE), comprising:
receiving a listen-before-talk (LBT) failure detection configuration associated with at least one of a dormant mode or a discontinuous reception (DRX) cycle in a first cell of a wireless communication network, wherein when in the dormant mode the UE performs one or more actions in a secondary cell (SCell) without monitoring a physical downlink control channel (PDCCH) in the SCell, wherein the receiving the LBT failure detection configuration further comprises:
receiving the LBT failure detection configuration indicating the set of uplink LBT failure detection occasions and a set of downlink LBT failure detection occasions;
performing, based on the LBT failure detection configuration, an LBT failure detection in the first cell while operating in the dormant mode for the first cell or during an inactive DRX configured-on duration of the DRX cycle; and
transmitting an LBT failure detection report based on the LBT failure detection.

11. A user equipment (UE), comprising:
a transceiver configured to receive a listen-before-talk (LBT) failure detection configuration associated with at least one of a dormant mode or a discontinuous reception (DRX) cycle in a first cell of a wireless communication network, wherein the LBT failure detection configuration indicates at least one of a set of uplink LBT failure detection occasions, and wherein an occasion of the set of uplink failure detection occasions is associated with a virtual uplink allocation;
a processor configured to perform, based on the LBT failure detection configuration, an LBT failure detection in the first cell while operating in the dormant mode for the first cell or during an inactive DRX configured-on duration of the DRX cycle, wherein when in the dormant mode the UE is configured to perform one or more actions in a secondary cell (SCell) without monitoring a physical downlink control channel (PDCCH) in the SCell, wherein the processor configured to perform the LBT failure detection is further configured to perform, based on the virtual uplink allocation, an LBT during the occasion of the set of uplink failure detection occasions; and
wherein the transceiver is further configured to
refrain from performing an uplink transmission based on the virtual uplink allocation, and
transmit an LBT failure detection report based on the LBT failure detection.

12. The user equipment of claim 11, wherein:
the LBT failure detection configuration indicates a set of downlink LBT failure detection occasions, wherein an occasion of the set of downlink failure detection occasions is associated with a preconfigured downlink allocation;
the processor configured to perform the LBT failure detection is configured to:
monitor, during the occasion of the set of downlink failure detection occasions, for a downlink preconfigured signal based on the preconfigured downlink allocation; and
the LBT failure detection report is based on the monitoring.

13. The user equipment of claim 11, wherein the transceiver configured to receive LBT failure detection configuration is configured to:
receive a configuration comprising a signal measurement configuration and the LBT failure detection configuration, the signal measurement configuration associated with at least one of a beam measurement or a channel state information (CSI) measurement.

14. The user equipment of claim 11, wherein:
the processor is further configured to determine at least one of a receive signal strength indicator (RSSI) measurement or a channel occupancy measurement in the first cell while operating in the dormant mode for the first cell or during the inactive DRX configured-on duration; and
the transceiver is further configured to transmit a measurement report including the at least one of the RSSI measurement or the channel occupancy measurement.

15. The user equipment of claim 14, wherein:
the processor configured to determine the at least one of the RSSI measurement or the channel occupancy measurement is configured to:
determine, while operating in the dormant mode for the first cell, the at least one of the RSSI measurement or the channel occupancy measurement in the first cell; and
the transceiver is further configured to:
receive a request for the measurement report; and
receive, in response to the measurement report, an instruction to switch from the dormant mode to a non-dormant mode for the first cell.

16. The user equipment of claim 14, wherein the transceiver configured to receive LBT failure detection configuration is configured to:
receive the LBT failure detection configuration including a periodic measurement configuration associated with the at least one of the RSSI measurement or the channel occupancy measurement.

17. A user equipment (UE), comprising:
a transceiver configured to receive a listen-before-talk (LBT) failure detection configuration associated with at least one of a dormant mode or a discontinuous reception (DRX) cycle in a first cell of a wireless communication network, wherein the transceiver configured to receive the LBT failure detection configuration is configured to:
  receive a first configuration indicating the set of uplink LBT failure detection occasions; and
    receive a second configuration indicating the set of downlink LBT failure detection occasions;
a processor configured to perform, based on the LBT failure detection configuration, an LBT failure detection in the first cell while operating in the dormant mode for the first cell or during an inactive DRX configured-on duration of the DRX cycle, wherein when in the dormant mode the UE is configured to perform one or more actions in a secondary cell (SCell) without monitoring a physical downlink control channel (PDCCH) in the SCell; and
wherein the transceiver is further configured to transmit an LBT failure detection report based on the LBT failure detection.

18. A user equipment (UE), comprising:
a transceiver configured to receive a listen-before-talk (LBT) failure detection configuration associated with at least one of a dormant mode or a discontinuous reception (DRX) cycle in a first cell of a wireless communication network,
wherein the LBT failure detection configuration indicates the set of uplink LBT failure detection occasions and a set of downlink LBT failure detection occasions;
a processor configured to perform, based on the LBT failure detection configuration, an LBT failure detection in the first cell while operating in the dormant mode for the first cell or during an inactive DRX configured-on duration of the DRX cycle, wherein when in the dormant mode the UE is configured to perform one or more actions in a secondary cell (SCell) without monitoring a physical downlink control channel (PDCCH) in the SCell; and
wherein the transceiver is further configured to transmit an LBT failure detection report based on the LBT failure detection.

19. A non-transitory computer-readable medium having program code recorded thereon, the program code comprising:
  code for causing a UE to receive a listen-before-talk (LBT) failure detection configuration associated with at least one of a dormant mode or a discontinuous reception (DRX) cycle in a first cell of a wireless communication network, wherein the LBT failure detection configuration indicates at least one of a set of uplink LBT failure detection occasions, and wherein an occasion of the set of uplink failure detection occasions is associated with a virtual uplink allocation;
  code for causing the UE to perform, based on the LBT failure detection configuration, an LBT failure detection in the first cell while operating in the dormant mode for the first cell or during an inactive DRX configured-on duration of the DRX cycle, wherein when in the dormant mode the UE performs one or more actions in a secondary cell (SCell) without monitoring a physical downlink control channel (PDCCH) in the SCell wherein performing the LBT failure detection comprises performing, based on the virtual uplink allocation, an LBT during the occasion of the set of uplink failure detection occasions;
  code for causing the UE to refrain from performing an uplink transmission based on the virtual uplink allocation; and
  code for causing the UE to transmit an LBT failure detection report based on the LBT failure detection.

20. The non-transitory computer-readable medium of claim 19, wherein:
  the LBT failure detection configuration indicates a set of downlink LBT failure detection occasions, wherein an occasion of the set of downlink failure detection occasions is associated with a preconfigured downlink allocation;
  the code for causing the UE to perform LBT failure detection is further configured to:
    monitor, during the occasion of the set of downlink failure detection occasions, for a downlink preconfigured signal based on the preconfigured downlink allocation; and
  the LBT failure detection report is based on the monitoring.

21. The non-transitory computer-readable medium of claim 19, wherein the code for causing the UE to receive the LBT failure detection configuration is further configured to:
  receive a configuration including a signal measurement configuration and the LBT failure detection configuration, the signal measurement configuration associated with at least one of a beam measurement or a channel state information (CSI) measurement.

22. The non-transitory computer-readable medium of claim 19, further comprising:
  code for causing the UE to determine at least one of a receive signal strength indicator (RSSI) measurement or a channel occupancy measurement in the first cell while operating in the dormant mode for the first cell or during the inactive DRX configured-on duration; and
  code for causing the UE to transmit a measurement report including the at least one of the RSSI measurement or the channel occupancy measurement.

23. The non-transitory computer-readable medium of claim 22, wherein:
  the code for causing the UE to determine the at least one of the RSSI measurement or the channel occupancy measurement is configured to:
    determine, while operating in the dormant mode for the first cell, the at least one of the RSSI measurement or the channel occupancy measurement in the first cell; and
  the program code further comprises:
    code for causing the UE to receive a request for the measurement report; and
    code for causing the UE to receive, in response to the measurement report, an instruction to switch from the dormant mode to a non-dormant mode for the first cell.

24. The non-transitory computer-readable medium of claim 22, wherein the code for causing the UE to receive LBT failure detection configuration is configured to:
  receive the LBT failure detection configuration including a periodic measurement configuration associated with the at least one of the RSSI measurement or the channel occupancy measurement.

* * * * *